(12) United States Patent
Takada et al.

(10) Patent No.: US 6,241,939 B1
(45) Date of Patent: Jun. 5, 2001

(54) HEATING BLOW FORMING APPARATUS AND HEATING BLOW FORMING METHOD

(75) Inventors: Minoru Takada; Koichi Sato, both of Ueda; Atsushi Sakurai; Yoichi Netsu, both of Saku, all of (JP)

(73) Assignee: Nissei ASB Machine Co., Ltd., Nagano-ken (JP)

( * ) Notice: Subject to any disclaimer, the term of this patent is extended or adjusted under 35 U.S.C. 154(b) by 0 days.

(21) Appl. No.: 09/051,953

(22) PCT Filed: Sep. 2, 1997

(86) PCT No.: PCT/JP97/03063

§ 371 Date: Sep. 8, 1998

§ 102(e) Date: Sep. 8, 1998

(87) PCT Pub. No.: WO98/09795

PCT Pub. Date: Mar. 12, 1998

(30) Foreign Application Priority Data

Sep. 2, 1996 (JP) .................................................. 8-250908

(51) Int. Cl.[7] .................................................. B29C 49/64
(52) U.S. Cl. .......................... 264/535; 264/537; 425/526; 425/529; 425/534
(58) Field of Search ..................................... 425/526, 534, 425/529, 533; 264/535, 537

(56) References Cited

U.S. PATENT DOCUMENTS

| | | |
|---|---|---|
| 3,339,230 | 9/1967 | Farrell . |
| 4,382,760 | * 5/1983 | Wiatt et al. .......................... 425/526 |
| 4,522,581 | * 6/1985 | Schad et al. .......................... 425/534 |
| 4,895,509 | * 1/1990 | Giacobbe .............................. 425/534 |
| 5,206,039 | * 4/1993 | Valyi ..................................... 425/534 |
| 5,780,069 | 7/1998 | Suzuki ............................... 425/174.4 |
| 5,834,038 | * 11/1998 | Ogihara et al. ....................... 425/534 |

FOREIGN PATENT DOCUMENTS

| | | |
|---|---|---|
| 1128512A | 8/1996 | (CN) . |
| 0 667 224 A1 | 8/1995 | (EP) . |
| 0 706 874 A1 | 4/1996 | (EP) . |
| 53-40624 | 10/1978 | (JP) . |
| 53-40625 | 10/1978 | (JP) . |
| 3-45692 | 7/1991 | (JP) . |
| 7-266412 | 10/1995 | (JP) . |
| 7-285166 | 10/1995 | (JP) . |
| 8-132517 | 5/1996 | (JP) . |
| 8-164556 | 6/1996 | (JP) . |
| WO 96/08356 | 3/1996 | (WO) . |
| WO 97/03805 | 2/1997 | (WO) . |

* cited by examiner

*Primary Examiner*—Robert Davis
(74) *Attorney, Agent, or Firm*—Cislo & Thomas LLP; David L. Hoffman, Esq.

(57) ABSTRACT

A heat blow molding apparatus includes a supply section 110, a heating station 112, a transfer section 114 and a blow molding station 116, all of which are disposed linearly in a direction A in which preforms 118 are carried. The supply section 110 supplies the preforms 118 each having a neck portion in their inverted state. The heating station 112 simultaneously heats the inverted preforms 118 while they are being carried parallel to each other. The transfer section 114 transfers the inverted preforms 118 after they have been heated by the heating station. The blow molding station 116 simultaneously blow molds the inverted preforms 118 transferred from the transfer section 114 into containers.

13 Claims, 15 Drawing Sheets

HEATING BLOW FORMING APPARATUS AND HEATING BLOW FORMING METHOD

BACKGROUND OF THE INVENTION

1. Field of the Invention

The present invention relates to an apparatus and method of heat blow molding, and particularly relates to heating a preform and blow molding the heated preform into a container.

2. Description of the Prior Art

An apparatus for heat blow molding a container is described, for example, by U.S. Pat. No. 4,185,812, Japanese Patent Publication No. 53-40624 and Japanese Patent Publication No. 53-40625.

The heat blow molding apparatus described in U.S. Pat. No. 4,185,812 comprises a heating station 10 and a blow molding station 12 arranged perpendicular to the heating station 10 to form an L-shaped layout, as shown in FIG. 15 of the accompanying drawings. The heating station 10 includes four carrying paths, each of which carries one preform to be heated in its upright state. The blow molding station includes a plurality of pallets 14 each of which receives a row of four heated preforms in their upright state. These pallets 14 are circulated in a rectangular path having longer and shorter sides. The longer sides of the rectangular path extend in a direction perpendicular to the direction in which the preforms are carried in the heating station 10. A set of four preforms are blow molded into containers at the middle of one of the longer sides. When each of the pallets 14 has moved to a removal section 16, the molded containers are removed out of the system.

The heat blow molding systems described in Japanese Patent Publications No. 53-40624 and 53-40625 are designed to heat and carry a row of inverted preforms simultaneously, the heated and inverted preforms being then blow molded using blow molds into containers.

The heat blow molding apparatus described in U.S. Pat. No. 4,185,812 will form an L-shaped layout because the direction in which the preforms are carried in the heating station 10 is perpendicular to the longer sides of the rectangular path in the blow molding station 12. As a result, the blow molding station 12 will not be arranged within the width of the heating station 10 to form an irregular layout. This raises a problem in that dead spaces will be created to increase an area of installation particularly when a plurality of such systems are arranged.

In particular, when beverage containers are to be molded, it is desirable to maintain a molding room clean. The maintenance of such a wide and clean area will increase the necessary cost. It is thus desired that the area of installation be reduced as much as possible.

In such a heat blow molding system, the upright preforms are heated in the heating station 10. In such a situation, the neck portions of the preforms will be topped. In addition, the heat will upwardly move along the upright preforms. This may excessively heat the preform necks and deform them. In such a case, furthermore, the carrying members for holding the upper parts of the preforms may be subjected to adverse effects from the heat.

In addition, the upright and heated preforms are blow molded also in the blow molding station 12. Therefore, the necessary parts including stretching rods for stretching the preforms in the blow molding step must be disposed above the preforms. This increases the entire height of the apparatus and thus raises a problem in securing the space of installation and also in performing the maintenance.

In the heat blow molding systems described in Japanese Patent Publications No. 53-40624 and 53-40625, the preforms are heated and blow molded in their inverted state. After the preforms have been heated at the same time, they are sequentially moved to and blow molded by the individual blow molds. Therefore, the individual heated preforms will be different from each other in time required to heat and blow mold the preforms. This raises a problem in that the quality of product becomes irregular.

SUMMARY OF THE INVENTION

An object of the present invention is to provide a heat blow molding apparatus which can reduce the area of installation as small as possible.

Another object of the present invention is to provide an apparatus and method of heat blow molding which will not excessively heat the neck portions of the preforms and which will prevent the preform carrying members from being subjected to adverse effects from the heat.

Still another object of the present invention is to provide a heat blow molding apparatus which has a reduced entire height and a reduced installation space and which can be easily maintained.

A further object of the present invention is to provide a heat blow molding apparatus which can make the quality of product regular by equalizing time required to heat the preforms simultaneously and then blow mold the heated preforms.

According to one aspect of the present invention, a heat blow molding apparatus comprises:

a supply section for supplying preforms each having a neck portion;

a heating station for heating the preforms supplied from the supply section;

a transfer section for transferring the preforms after they have been heated in the heating station; and a blow molding station for blow molding the preforms transferred from the transfer section into containers, the supply section, the heating station, the transfer section and the blow molding station being arranged linearly along a first direction in which the preforms are carried, wherein the supply section comprises:

an arrangement mechanism for arranging the preforms with a given pitch in a second direction perpendicular to the first direction while maintaining the preforms in their upright state with the neck portions thereof facing upward; and an inverting and delivering mechanism for inverting the upright preforms and for delivering the inverted preforms to the heating station, wherein the heating station comprises:

first carrying paths disposed parallel along the first direction;

first carrying members for supporting the inverted preforms delivered from the supply section;

a first carrying mechanism for intermittently carrying the first carrying members along the first carrying paths;

a heating box located in each of the first carrying paths; and a rotation mechanism for rotating the preforms at least within the heating box, wherein the transfer section has a movement mechanism for moving the preforms carried parallel along the first carrying paths from the heating station to the blow molding station for delivery while maintaining their inverted position, and wherein the blow molding station comprises:

a second carrying path formed into a substantially rectangular configuration having two shorter sides and two longer sides, the two longer sides being positioned parallel to the first direction;

second carrying members for supporting the preforms in their inverted state, the second carrying members being carried along the second carrying path;

a second carrying mechanism for intermittently carrying the second carrying members along the second carrying path;

a receiving section located in one of the two shorter sides that is disposed on the side of the transfer section in the second carrying path;

a blow molding section located in one of the two longer sides in the second carrying path for stretch blow molding the preforms received by the receiving section simultaneously into containers; and a removal section located in the other shorter sides opposed to the receiving section for removing the containers after being molded in the blow molding section.

According to the present invention, the supply section, the heating station, the transfer section and the blow molding station are disposed linearly along the direction in which the preforms are carried. In addition, the longer sides of the second carrying path in the blow molding station are located parallel to the direction in which the preforms are carried (i.e., first direction) in the heating station. As a result, the apparatus will not be spread in a direction perpendicular to the direction in which the preforms are carried. This can provide a minimum area of installation. The area of the cleaned room in which beverage containers are to be molded can be effectively used.

The arrangement mechanism in the supply section arranges the preforms with a given pitch. The arranged preforms are then inverted from their upright state by the inverting and delivering mechanism, the inverted preforms being then delivered to the heating station. Therefore, the preforms can be easily supplied while being suspended by supporting the neck portions of the preforms. Since the preforms arranged with the given pitch have been inverted, the subsequent heating station can receive and carry the inverted preforms.

In the heating station, the first carrying paths disposed parallel to each other intermittently carry the inverted preforms. Within a heating box, the preforms are heated while being rotated by the rotation mechanism. Thus, the neck portions of the preforms as well as the first carrying members for supporting the inverted preforms will not be excessively heated. This can reliably prevent any deformation in the preforms and any adverse effects to the first carrying members due to heat. In addition, the preforms can be uniformly heated around their circumference by rotating the preforms.

The transfer section transfers the preforms from the heating station to the blow molding station while maintaining them inverted.

In the blow molding station, the receiving section located at one shorter side of the second carrying path receives the inverted preforms. The blow molding section on one longer side of the second carrying path simultaneously stretch blow molds the preforms from the receiving section into containers. The molded containers can be removed out of the system through the removal section on the other shorter side of the second carrying path. While the heated preforms are carried parallel to each other, they are simultaneously blow molded. This can maintain regular product quality. Since the blow molding section is disposed on one longer side of the second carrying path, a blow mold clamping mechanism can be placed in the space between the longer sides of the second carrying path. This permits that space to be more effectively utilized.

It is preferred in the present invention that the arrangement mechanism comprises:

supporting members for supporting the preforms in their upright state; and a pitch converting mechanism for converting the pitch of the preforms by moving the supporting members in the second direction.

The supply section may include a supply path for supplying preforms in one line, and wherein the supporting members are moved in the second direction by the pitch converting mechanism so that the preforms supplied from the supply section in one line can be sequentially supported by the supporting members.

It is preferred in the present invention that the inverting and delivering mechanism comprises:

first gripping members for gripping the neck portions of the preforms after they have been arranged with the given pitch by the arrangement mechanism;

a first opening/closing mechanism for opening or closing the first gripping members to grip or release the preforms;

a first elevator mechanism for moving the first gripping members upward and downward; and an inverting mechanism for inverting the first gripping members.

Thus, the preforms can be delivered to the heating station after they have been inverted while being supported at their neck portions.

It is preferred in the present invention that the movement mechanism in the transfer section comprises:

second gripping members for gripping the neck portions of the preforms;

a second opening/closing mechanism for opening or closing the second gripping members to grip or release the preforms; and a second elevator mechanism for moving the second gripping members upward and downward.

Because the movement mechanism of the transfer section includes the second gripping members, the second opening/closing mechanism and the second elevator mechanism, the preforms can be reliably delivered to the blow molding station while maintaining them inverted by supporting their neck portions.

It is preferred in the present invention that the blow molding station comprises:

a machine base;

a stationary base fixedly mounted on the machine base; and a movable base enabled to move on the machine base along a parallel direction to the longer sides of the second carrying path, wherein the second carrying mechanism in the second carrying path comprises:

sprockets mounted on the stationary and movable bases;

a chain spanned between the sprockets; and a biasing mechanism for biasing the movable base in a direction in which the shorter sides of the second carrying path are separated from each other to apply a tension to the chain through the sprockets, and wherein the removal section has a removing device on the movable base for taking containers molded at the blow molding section out of the second carrying members.

Thus, when the tension on the chain is adjusted by moving the movable base, the removing device can be moved with movement of the movable base. Therefore, it is not required to position the removing device relative to the second carrying mechanism after adjustment of the tension.

According to another aspect of the present invention, a heat blow molding apparatus comprises:

a heating station for simultaneously heating preforms carried parallel to a first direction, the heating station comprising first carrying paths disposed parallel to each other for carrying the preforms each having a neck portion in their inverted state with the neck portions thereof facing downward;

a transfer section for transferring the preforms carried parallel to each other while maintaining their inverted state; and a blow molding station for simultaneously blow molding the preforms, which are simultaneously heated at the heating station and transferred by the transfer section into containers.

The present invention may further provide a method of heat blow molding comprising the steps of:

simultaneously heating preforms carried parallel to a first direction within a heating station while the preforms each having a neck portion are supported in their inverted state with the neck portions thereof facing downward;

transferring the preforms which are simultaneously heated and carried parallel one another from the heating station to a blow molding station while maintaining the preforms inverted; and simultaneously blow molding the preforms received by the blow molding station into containers while maintaining the preforms inverted.

According to these aspect of the present invention, the preforms are heated by the heating station, transferred by the transfer section and blow molded by the blow molding station, while being maintained inverted. Thus, the neck portions of the preforms and carrying members will not be adversely affected by the heat in the heating station. In addition, the blow molding station does not require any mechanism, such as stretching rods, above the preforms. This can reduce the entire height of the apparatus. Moreover, since the preforms simultaneously heated while being carried parallel to each other are simultaneously blow molded at the blow molding station, product quality can be maintained.

A supply section for supplying the preforms may be located upstream of the first carrying paths in the heating station. Such a supply section may be of the same structure as in one of the aforementioned aspects of the present invention.

Also in the other aspects of the heat blow molding apparatus according to the present invention, the heating station, transfer section and blow molding station may be of the same structure as in the heat blow molding apparatus according to one aspect of the present invention.

According to still another aspect of the present invention, a heat blow molding apparatus comprises:

a heating station for heating preforms while carrying them in a first direction;

a transfer section for transferring the preforms heated by the heating station; and a blow molding station for blow molding the preforms transferred from the transfer section into containers, the heating station, the transfer section and the blow molding station being arranged linearly in the first direction, wherein the heating station having first carrying paths disposed parallel to one another, the heating station simultaneously heating the preforms carried along the first carrying paths, wherein the blow molding station comprises:

a second carrying path formed into a substantially rectangular configuration having two shorter sides and two longer sides, the two longer sides being disposed parallel to the first direction;

second carrying members for being carried along the second carrying path while supporting the preforms;

a receiving section located on one of the shorter sides of the second carrying path which is disposed on the side of the transfer section; and a blow molding section located in one of the two longer sides of the second carrying path for simultaneously stretch blow molding the preforms received by the receiving section into containers, and wherein the transfer section transfers the preforms from the terminal ends of the first carrying paths in the heating station to the receiving section of the blow molding station.

DESCRIPTION OF THE PREFERRED EMBODIMENTS

Some preferred embodiments of the present invention will now be described in more detail with reference to the drawings.

FIGS. 1 to 11 show a heat blow molding apparatus constructed in accordance with one embodiment of the present invention.

Figure 1:
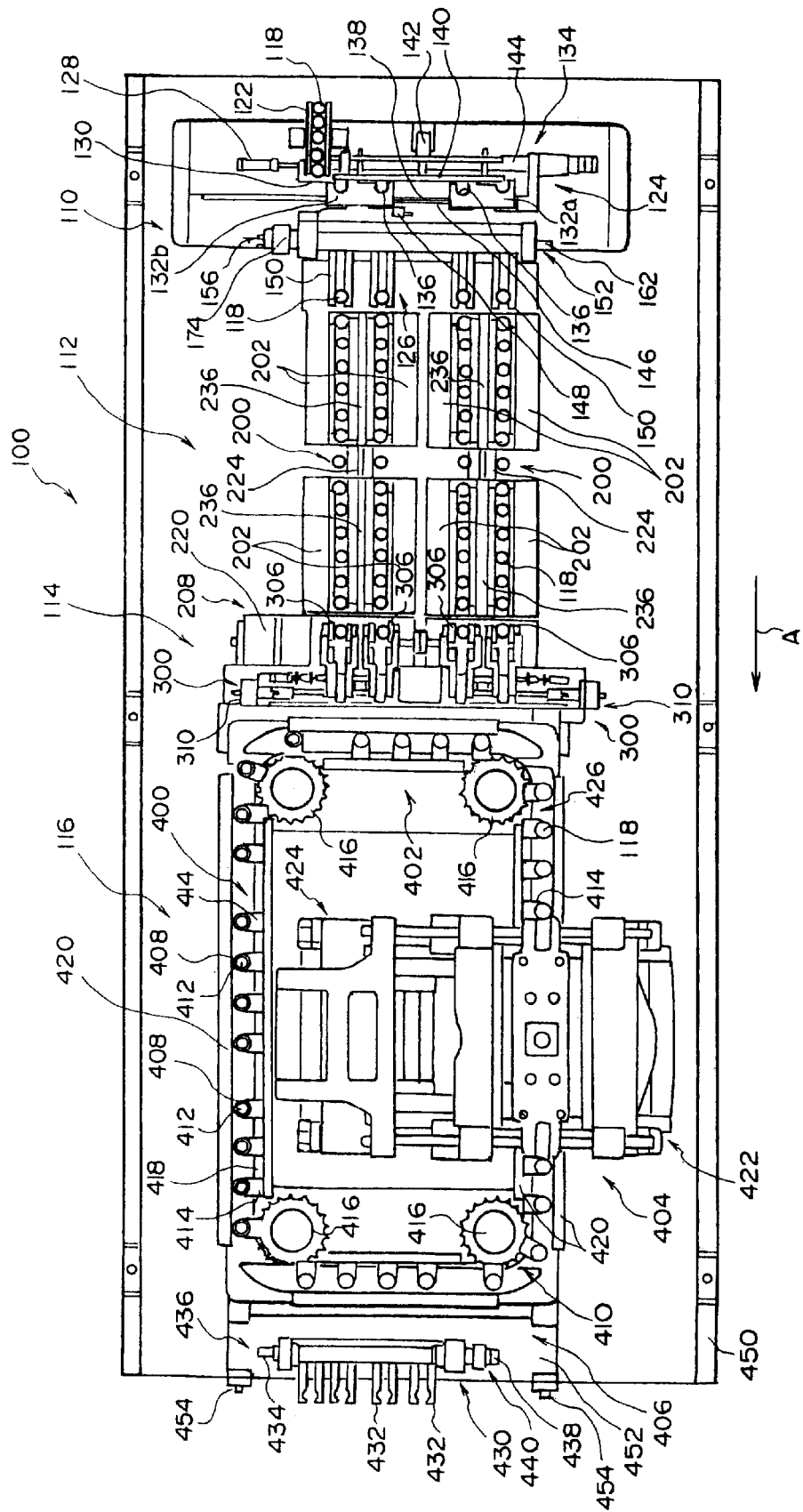
FIG. 1 is a plan view of a heat blow molding apparatus according to one form of the present invention.

FIG. 1 is a plan view showing the whole structure of a heat blow molding apparatus 100.

The heat blow molding apparatus 100 comprises a supply section 110, a heating station 112, a transfer section 114 and a blow molding station 116, all of which are disposed linearly in a direction A (or first direction) in which preforms 118 are carried.

The supply section 110 supplies the preforms 118 each having a neck portion 120 (see FIGS. 7 and 8) to the heating station 112. For such a purpose, the supply section 110 comprises supply rails 122, an arrangement mechanism 124 and an inverting and delivering mechanism 126.

Figure 2:
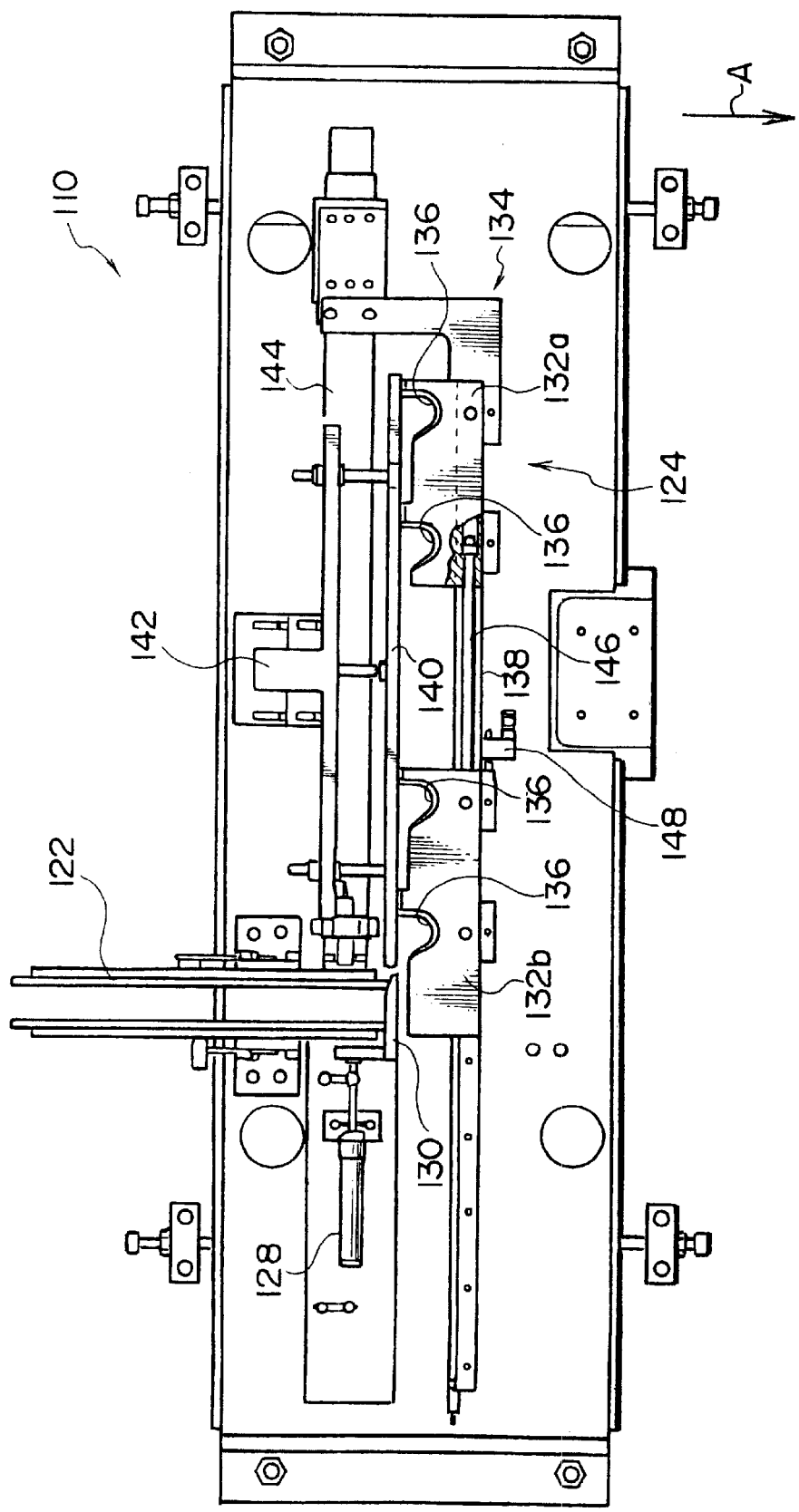
FIG. 2 is a plan view of an arrangement mechanism in the supply section of FIG. 1.

As shown in FIG. 2, the supply rails 122 are disposed along the carrying direction A of the preform 118 and inclined downwardly toward the arrangement mechanism 124. The supply rails 122 thus support the lower part of the neck portion 120 in each of the upright preforms 118 so that the preforms 118 can be continuously carried under gravity. At the ends of the supply rails 122 located at the side of the arrangement mechanism 124, a supply stopper 130 enabled to open and close by an opening/closing cylinder 128 is disposed.

The arrangement mechanism 124 receives the preforms 118 continuously supplied from the supply rails 122 four at a time and arranges them with a given pitch in a direction perpendicular to the preform carrying direction A (or second direction) as shown in FIG. 2. For such a purpose, the arrangement mechanism 124 comprises a pair of supporting members 132a and 132b each of which supports two upright preforms 118, and a pitch converting mechanism 134 which moves the pair of supporting members 132a and 132b to the supply rails 122 wherein each of the supporting members can receive two upright performs 118 and position them at a predetermined delivering position.

Each of the supporting members 132a and 132b has two notches 136 formed therein with a given pitch for receiving the lower parts of the neck portions of the preforms 118. The supporting members can be slidably moved along a supply linear guide 138 in a direction perpendicular to the preform carrying direction A. Another guide 140 for preventing the preforms 118 from falling is disposed at a position corresponding to the notches 136 in the supporting members 132a and 132b. The guide 140 is movable toward and away from the supporting members 132a and 132b through a drive cylinder 142. After the preforms 118 have been inserted into the notches 136 of the supporting members 132a and 132b, the guide 140 is moved toward the supporting members 132a and 132b to prevent the preforms 118 from falling. When the preforms 118 are removed out of the system, the supporting members 132a and 132b can be retracted so that they will not interfere with removal of the preforms 118.

The pitch converting mechanism 134 comprises a rodless cylinder 144 connected to one of the supporting members 132a, a stopper rod 146 slidably connecting the supporting member 132a to the other supporting member 132b and a stopper 148 for stopping the supporting member 132b at a given position.

When the supporting member 132a is moved from the position of FIG. 2 in the leftward direction as viewed in FIG. 2 along the supply linear guide 138 through the rodless cylinder 144, the supporting member 132a will engage the supporting member 132b so that they can be leftward moved together past the position of the supply rails 122 to a position on the left-hand side of the supply linear guide 138. At this position, the supporting members 132a and 132b will be stopped and placed in their stand-by state. During this movement of the supporting members 132a and 132b, the supply stopper 130 of the supply rails 122 is opened so that the preforms 118 can be inserted into the notches 136 in the supporting members 132a and 132b. In the aforementioned stand-by state, a pedestal (not shown) in the opening/closing cylinder 128 of the supply stopper 148 functions as a guide for preventing the preforms 118 from falling off the supporting members 132a and 132b. When the rodless cylinder 144 is moved from such a position in the rightward direction as viewed in FIG. 2, both the supporting members 132a and 132b are pulled by the stopper rod 146. At this time, the supporting member 136a can pass through the position of the stopper 148, but the other supporting member 136b will be engaged and stopped by the stopper 148. As a result, the supporting members 132a and 132b will be stopped by the stopper rod 146 at such a position that they are held spaced away from each other with a given spacing as shown in FIG. 2.

Figure 3:
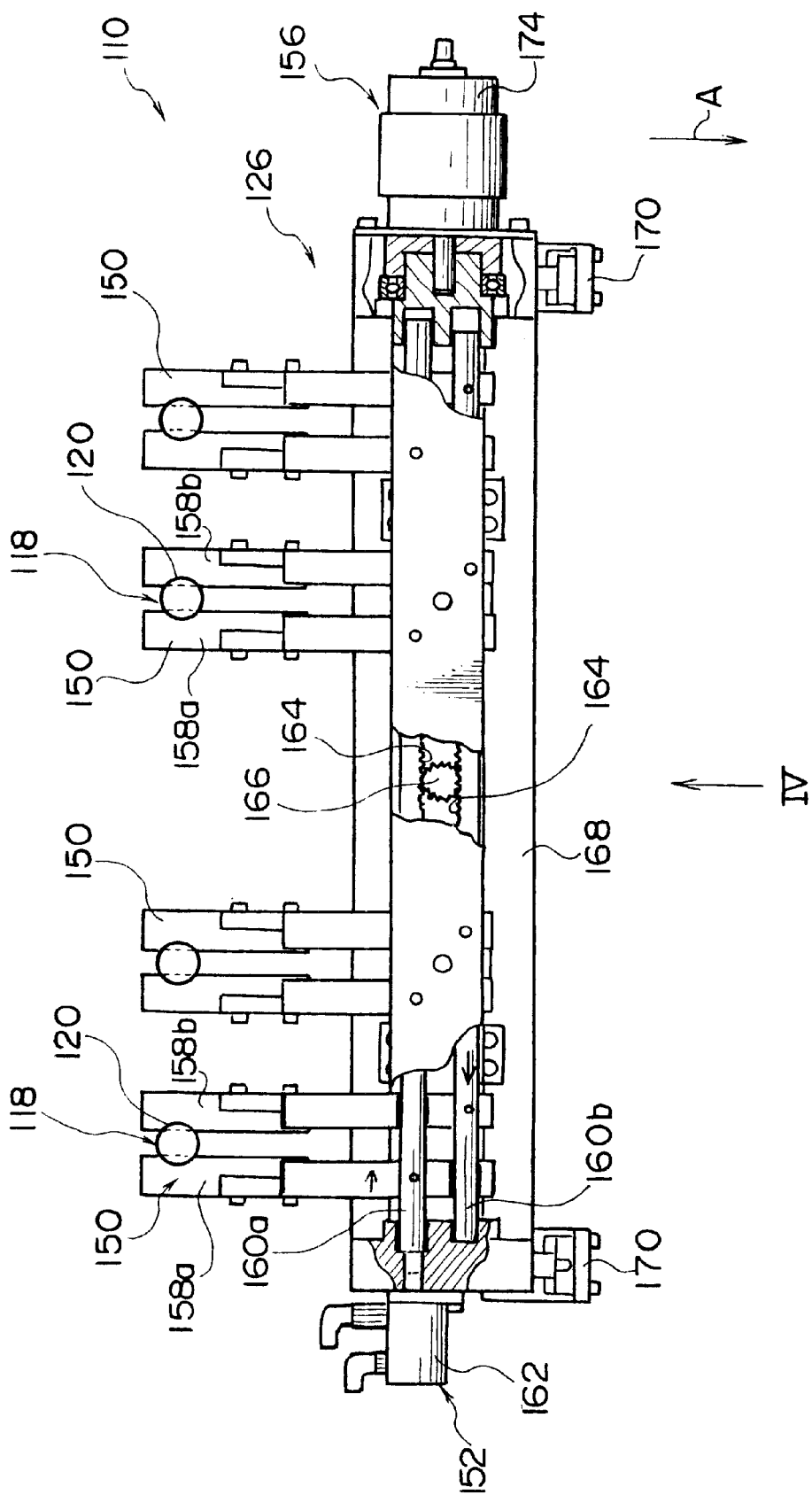
FIG. 3 is a plan view of an inverting and delivering mechanism in the supply section of FIG. 1.
Figure 4:
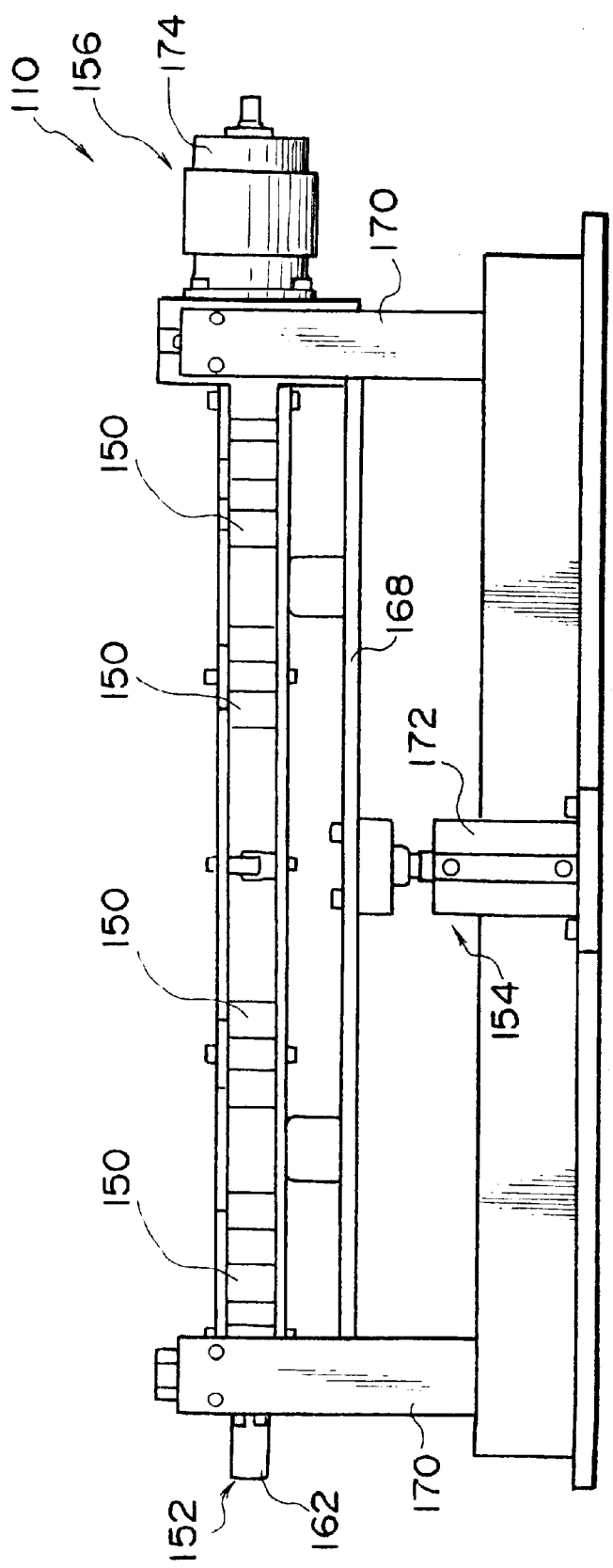
FIG. 4 is a front view as viewed from the direction of arrow IV in FIG. 3.

As shown in FIGS. 3 and 4, the inverting and delivering mechanism 126 inverts four upright preforms 118 supported and arranged by the supporting members 132a and 132b. The inverted preforms 118 are then delivered to the heating station 112. For such a purpose, the inverting and delivering mechanism 126 comprises four first gripping members 150, a first opening/closing mechanism 152, a first elevator mechanism 154 and a first inverting mechanism 156.

Each of the first gripping members 150 grips the neck portion of the preform 118 supported and delivered by the supporting members 132a and 132b, and is disposed at a position corresponding to a preform 118 placed at its delivery position. Each of the first gripping members 150 comprises a pair of gripping arms 158a and 158b.

The first opening/closing mechanism 152 opens and closes the gripping arms 158a and 158b of each of the first gripping members 150 so that the preform 118 an be gripped or released. For such a purpose, the opening/closing mechanism 152 comprises a pair of slide rods 160a and 160b disposed parallel to each other and an opening/closing cylinder 162 for the gripping member.

One of the gripping arms 158a is fixedly attached to one of the slide rods 160a, the other gripping arm 158b slidably extending through this one slide rod 160a. On the other hand, the one gripping arm 158a slidably extends through the other slide rod 160b while the other gripping arm 158b is fixedly attached to the other slide rod 160b. Each of the slide rods 160a and 160b includes a rack portion 164 formed therein facing each other and substantially at its central part. A pinion 166 is disposed in the space between the rack portions 164 and engages with them.

The gripping members opening/closing cylinder 162 is connected to the one slide rod 160a. When the one slide rod 160a is slidably moved by the cylinder 162, the other slide rod 160b will be slidably moved in the opposite direction through the pinion 166. Thus, the gripping arms 158a and 158*b* in each of the first gripping members 150 can be opened or closed.

The first elevator mechanism 154 moves the first gripping members 150 in the upward and downward direction so that the preforms 118 can be removed therefrom and is delivered to the heating station. For such a purpose, the first elevator mechanism 154 comprises: support brackets 170 movably supporting a support frame 168 in the upward and downward direction on which the first gripping members 150, the first opening/closing mechanism 152 and the first inverting mechanism 156 are mounted; and an elevator cylinder 172 for moving the support frame 168 in the upward and downward direction along the support brackets 170.

The inverting mechanism 156 inverts the first gripping members 150. For such a purpose, the inverting mechanism 156 comprises an invert actuator 174 mounted on the support frame 168. The invert actuator 174 rotates the first opening/closing mechanism 152 180 degrees relative to the support frame 168 for inverting the first gripping members 150.

When the first gripping members 150 have been lifted by the first elevator mechanism 154 and positioned at the side of the arrangement mechanism 124 by the first inverting mechanism 156, the first gripping members 150 are opened by the first opening/closing mechanism 152, and when the first gripping members 150 have been lowered by the first elevator mechanism 154, the gripping members 150 are closed by the first opening/closing mechanism 152, so that they will grip the neck portions 120 of the preforms 118 held by the supporting members 132*a* and 132*b*. If the first gripping members 150 are lifted from such a state by the first elevator mechanism 154, the preforms 118 can be removed from the supporting members 132*a* and 132*b*. If the first gripping members 150 are inverted from such a state by the first inverting mechanism 156, the preforms 118 will be inverted. If in this position the first gripping members 150 are lowered by the elevator mechanism 154 and opened by the first opening/closing mechanism 152, the preforms 118 can be delivered to the heating station 112.

As shown in FIG. 1 and FIGS. 5 to 8, the heating station 112 heats the preforms 118 supplied from the supply section 110 and comprises two first carrying paths 200 disposed parallel to each other, heating boxes 202 and a rotation mechanism 204.

Each of the first carrying paths 200 comprises first carrying members 206 for supporting the inverted preforms 118 delivered from the supply section 110 and a first carrying mechanism 208 for intermittently carrying the first carrying members 206 in the direction A in which the preforms 118 are carried.

The first carrying members 206 are provided on the first carrying path 200 in a direction perpendicular to the preform carrying direction A. The pair of carrying members 206 are disposed to be spaced away from one another with a given distance along the preform carrying direction A.

Each of the first carrying members 206 is rotatably mounted on its bracket 212 and has a preform support portion 214 extending upward from the top of the bracket 212. The preform support 214 is inserted into the neck portion 120 of a preform 118 to support the preform in its inverted state. Each of the first carrying members 206 also includes a rotation sprocket 216 mounted thereon at the bottom end.

Each of the first carrying mechanism 208 comprises a first carrying chain 218 and a first carrying actuator 220.

Each of the first carrying chains 218 is disposed extending between the respective first carrying member pairs 206 in the preform carrying direction A. The first carrying chain 218 is supported by a drive sprocket 222 on the side of the supply section 110 and by a drive sprocket on the side of the transfer section 114, the drive sprocket being operatively connected to the first carrying actuator 220. Each of the brackets 212 supporting the first carrying members 206 is fixedly connected, at its middle part, to the first carrying chain 218. Each of the first carrying chains 218 is guided by a corresponding first carrying rail 224 which is disposed along the corresponding first carrying path 200.

The first carrying actuator 220 intermittently drives the corresponding first carrying chain through a drive sprocket (not shown), and comprises a cam 226 and a stopper device 228.

The cam 226 is formed with intermittent stoppage notches 230 angularly spaced away from one another by 90 degrees around the outer periphery of the cam 226.

The stopper device 228 comprises a cam follower 232 receivable by the notches 230 in the cam 226 and an air cylinder 234 for driving the cam follower 232. With actuation of this air cylinder 234, the cam follower 232 is caused to engage into one of the notches 230 in the cam 226 so that the first carrying actuator 220 can be intermittently stopped at every 90 degree position.

A pair of the heating boxes 202 are disposed to span the corresponding first carrying path 200 at its middle. Two pairs of such heating boxes 202 are located spaced away from each other in the preform carrying direction A.

Between the two pairs of the heating boxes 202 is provided a space corresponding to a single preform 118. When one preform 118 is stopped within such a space, the difference of temperature between the inside and outside of that preform 118 heated by the upstream heating boxes 202 can be reduced before it is moved into the downstream heating boxes 202. However, such a space may be varied depending on the wall thickness of the preforms 118.

Between each pair of the heating boxes 202 is further provided a reflector 236 which extends in the preform carrying direction A to block two preforms 118 held by each carrying members from each other.

Figure 8:
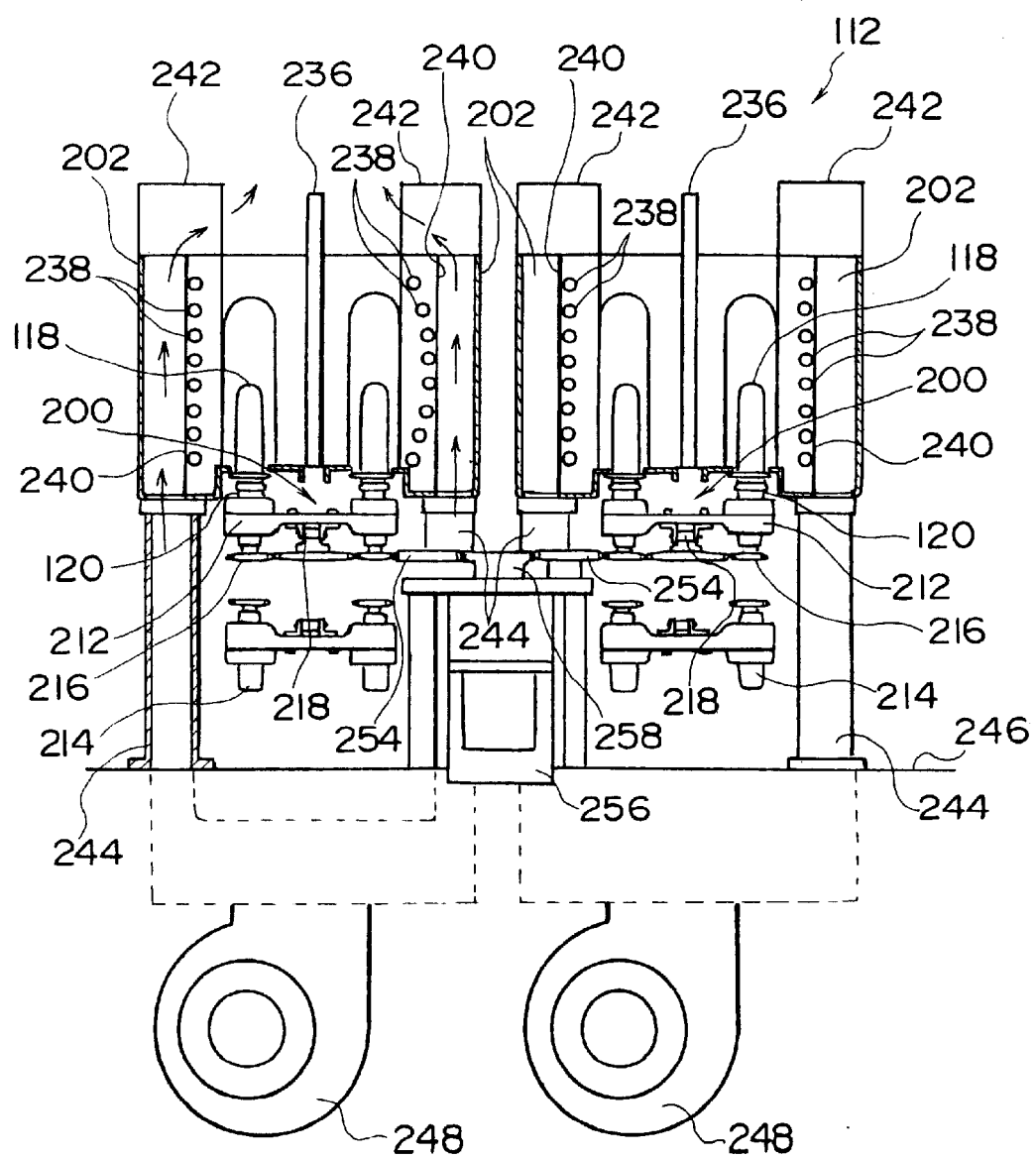
FIG. 8 is a cross-sectional view of heater boxes in the heating station shown in FIGS. 1 and 5.

Each heating box 202 includes heaters 238 which extend in the preform carrying direction A and are stacked along the length of the preforms 118 being carried. Each of the heaters 238 is supported for movement relative to the preforms 118, as shown in FIG. 8 at the second heating box 202 counted from the left side thereof. This permits the temperature profile to be regulated along the length of the preforms 118.

Each heating box 202 also includes a reflector 240 located behind the stack of the heater 238. The top of the reflector 240 is located adjacent to a terminal box 242. The bottom of each of the heating boxes 202 is supported on a bed 246 through hollow support legs 244 which communicate with the interior of the heating boxes 202. Each of the support legs 244 is connected to a corresponding blower 248 which is located within the bed 246.

Cooling air is supplied from the blowers 248 to the interior of the heating boxes 202 behind the respective reflectors 240 through the support legs 244. The cooling air escapes upward through the heating boxes 202. Thus, the reflectors 240 can be presented from overheating, resulting in elongation of the service life in the reflectors 240. The cooling air flowing in the upward direction can also cool the terminal boxes 242. Furthermore, the cooling air fed from the blowers 248 is brought into contact with the opposite support ends of the heaters 238 extending in the preform carrying direction A, the support ends of the heaters being most subject to damage due to heat. This can prolong the service life in the heaters.

Figure 6:
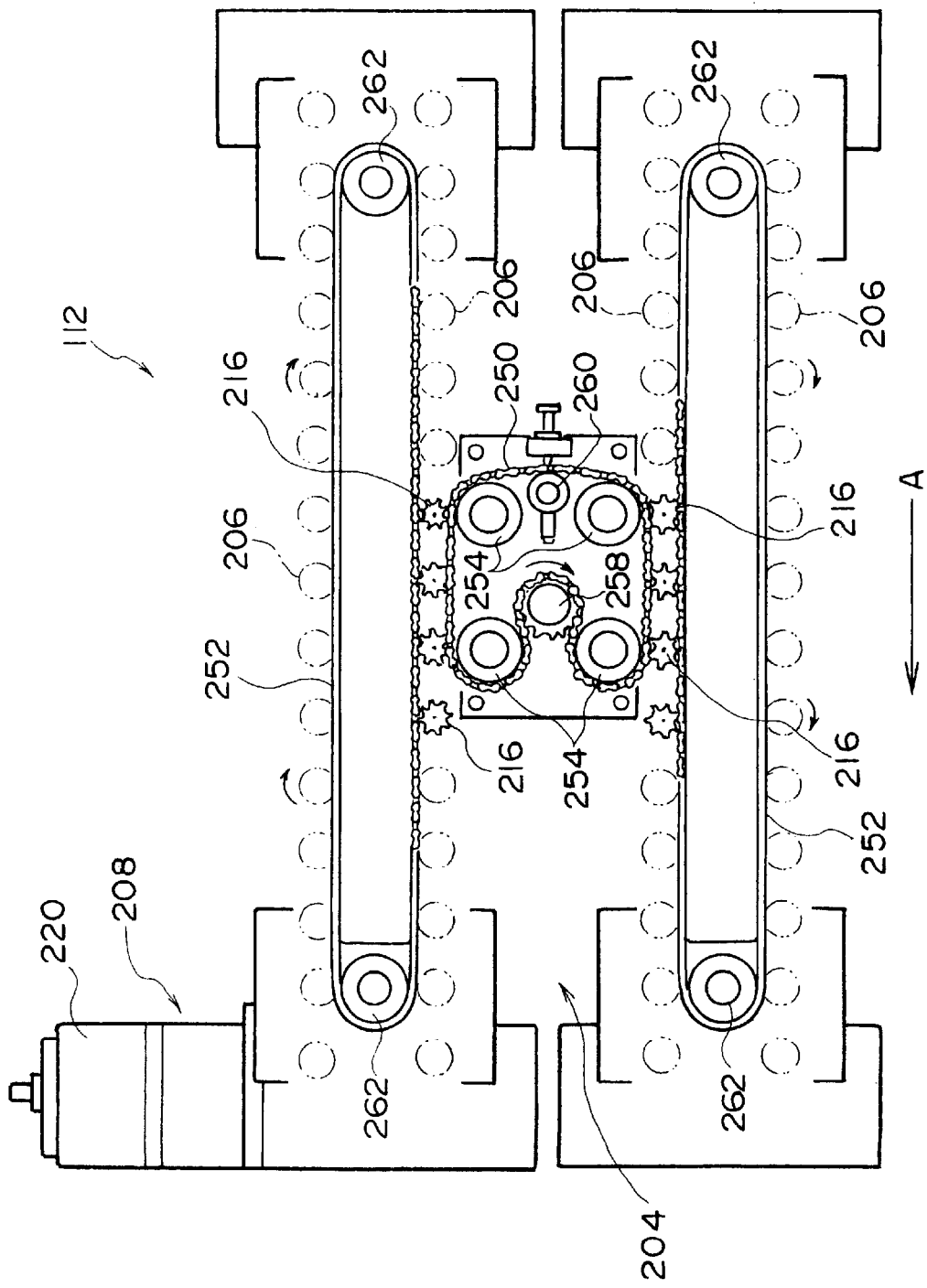
FIG. 6 is a plan view of a preform rotating mechanism in the heating station shown in FIGS. 1 and 5.
Figure 7:
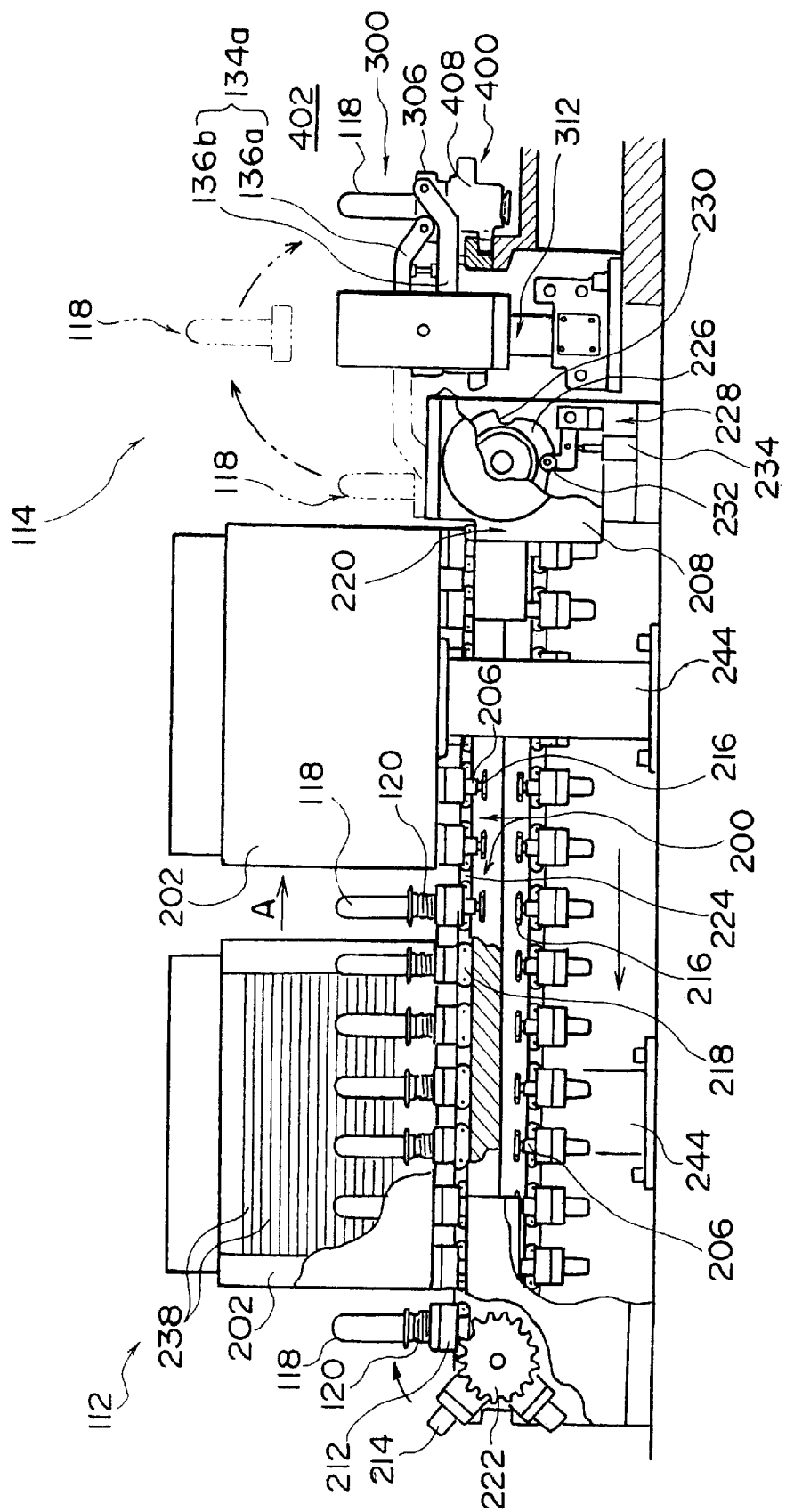
FIG. 7 is a side view, partially broken, of FIG. 5.

The rotation mechanism 204 comprises a first rotation chain 250 and second rotation chains 252, as shown in FIG. 6.

The first rotation chain 250 passes around four drive toothless sprockets 254 and also around a drive sprocket 258. The four drive sprockets 254 are located between the two first carrying paths 200 and adjacent to the rotation sprockets 216 in the respective first carrying members 206 which are carried inside of the respective first carrying paths 200. On the other hand, the drive sprocket 258 is located between the driven sprockets 254 and operatively connected to a rotation motor 256 shown in FIG. 8. The first rotation chain 250 is in operative engagement with the rotation sprockets 216 in three of the carrying members 206 inside of the respective first carrying paths 200. The first rotation chain 250 is engaged with a sprocket 260 which gives tension.

Each of the second rotation chains 252 extends between two carried rows of the first carrying members 206 substantially along the length of the corresponding first carrying path 200 and are spanned between two toothless sprockets 262. The second rotation chain 252 is also in operative engagement with the rotation sprockets 261 in two carried rows of the first carrying members 206 in the respective first carrying paths 200.

When the rotation motor 256 rotates the drive sprocket 258 and moves the first rotation chain 250, the rotation sprockets 216 of the three first carrying members 206 engaging the first rotation chain 250 in the respective carrying path 200 will also be rotated. Thus, the second rotation chains 252 are moved. The other rotation sprockets 216 engaging each of the second rotation chains 252 are also rotated to rotate the preforms 118.

While rotating the preforms 118, they are uniformly heated in their circumferential direction.

Figure 5:
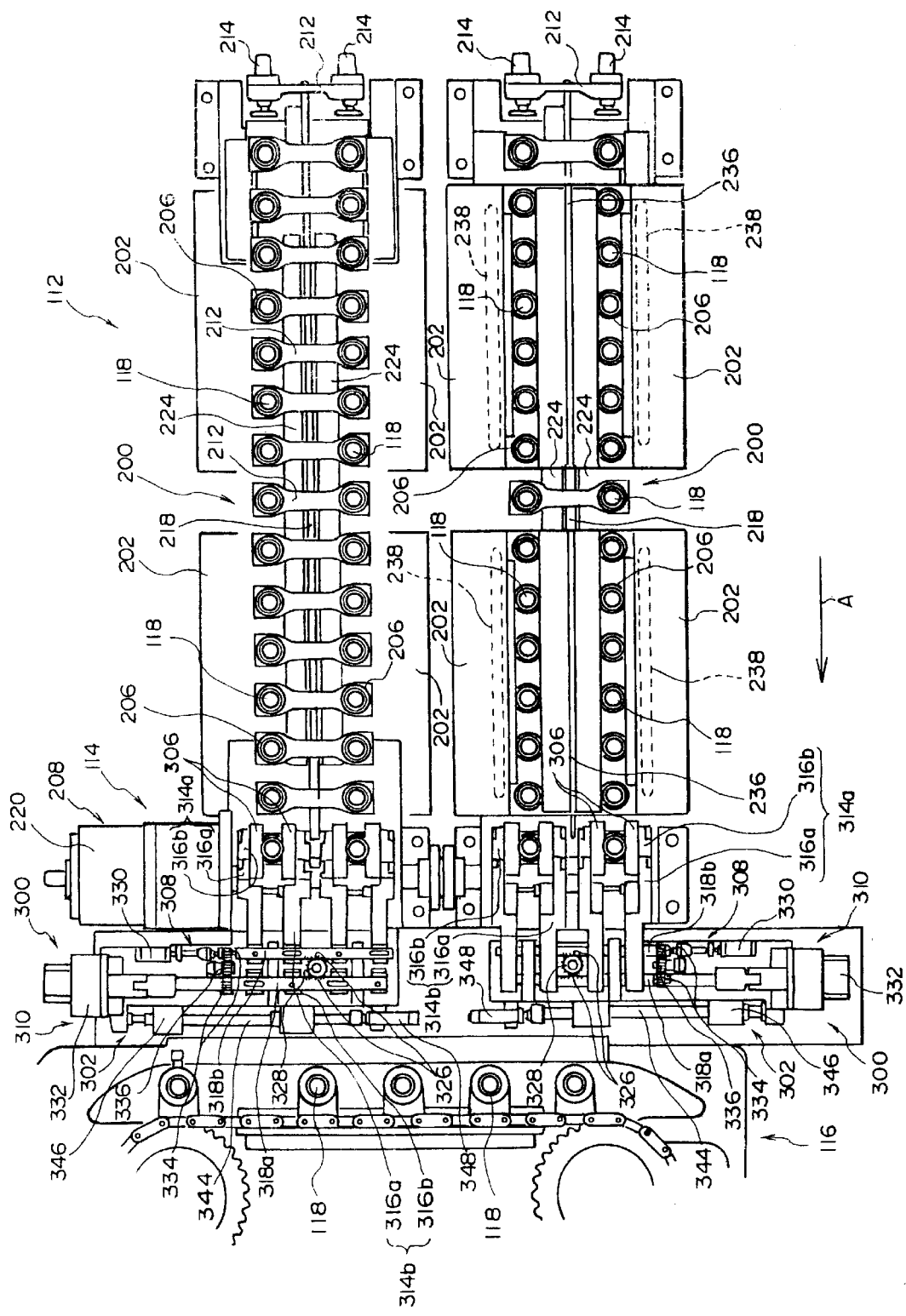
FIG. 5 is an enlarged plan view of the heating station and transfer section in FIG. 1.
Figure 9:
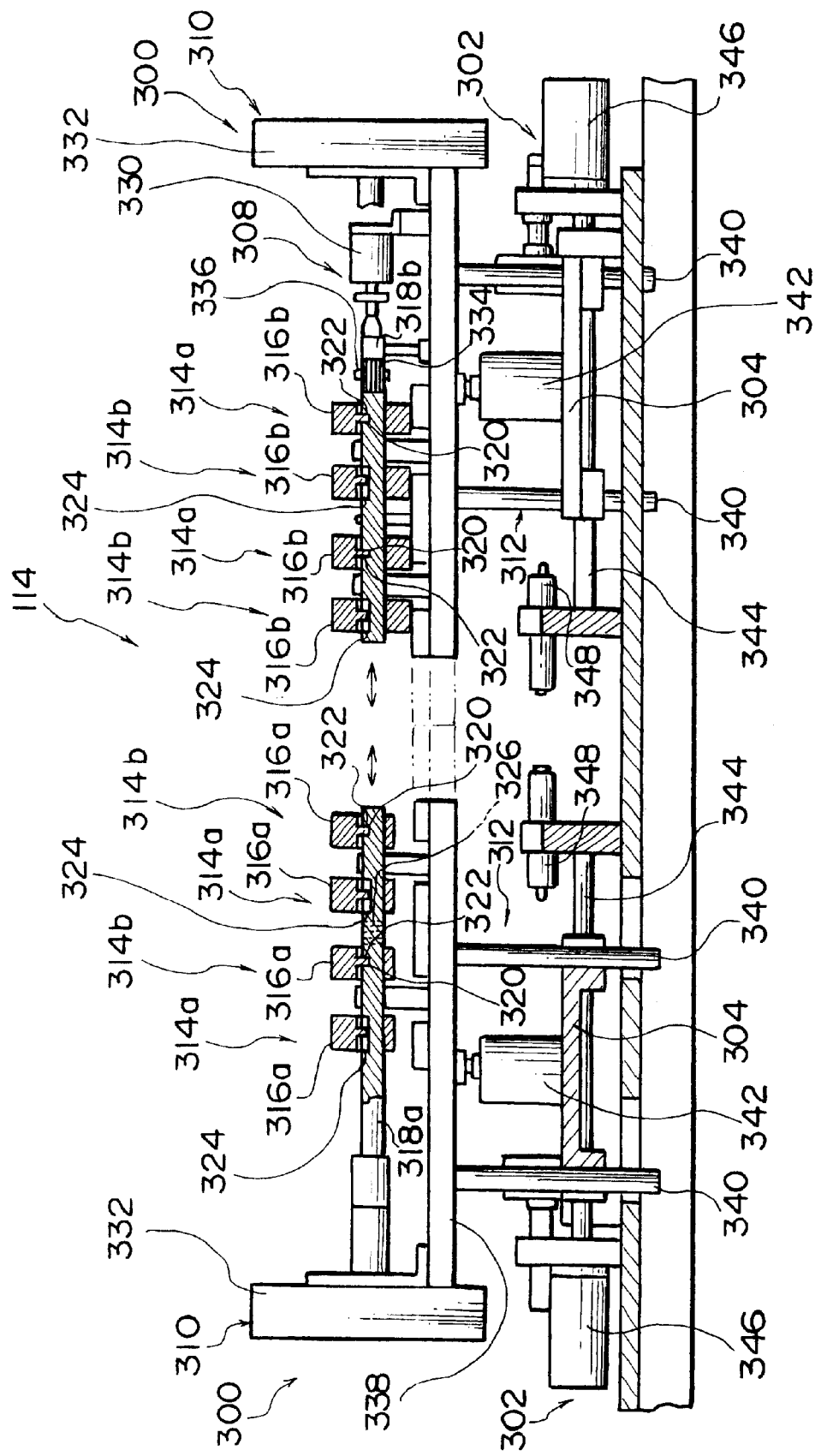
FIG. 9 is a cross-sectional view of a transferring mechanism in the transfer section of FIG. 7 as viewed from the front side.
Figure 10:
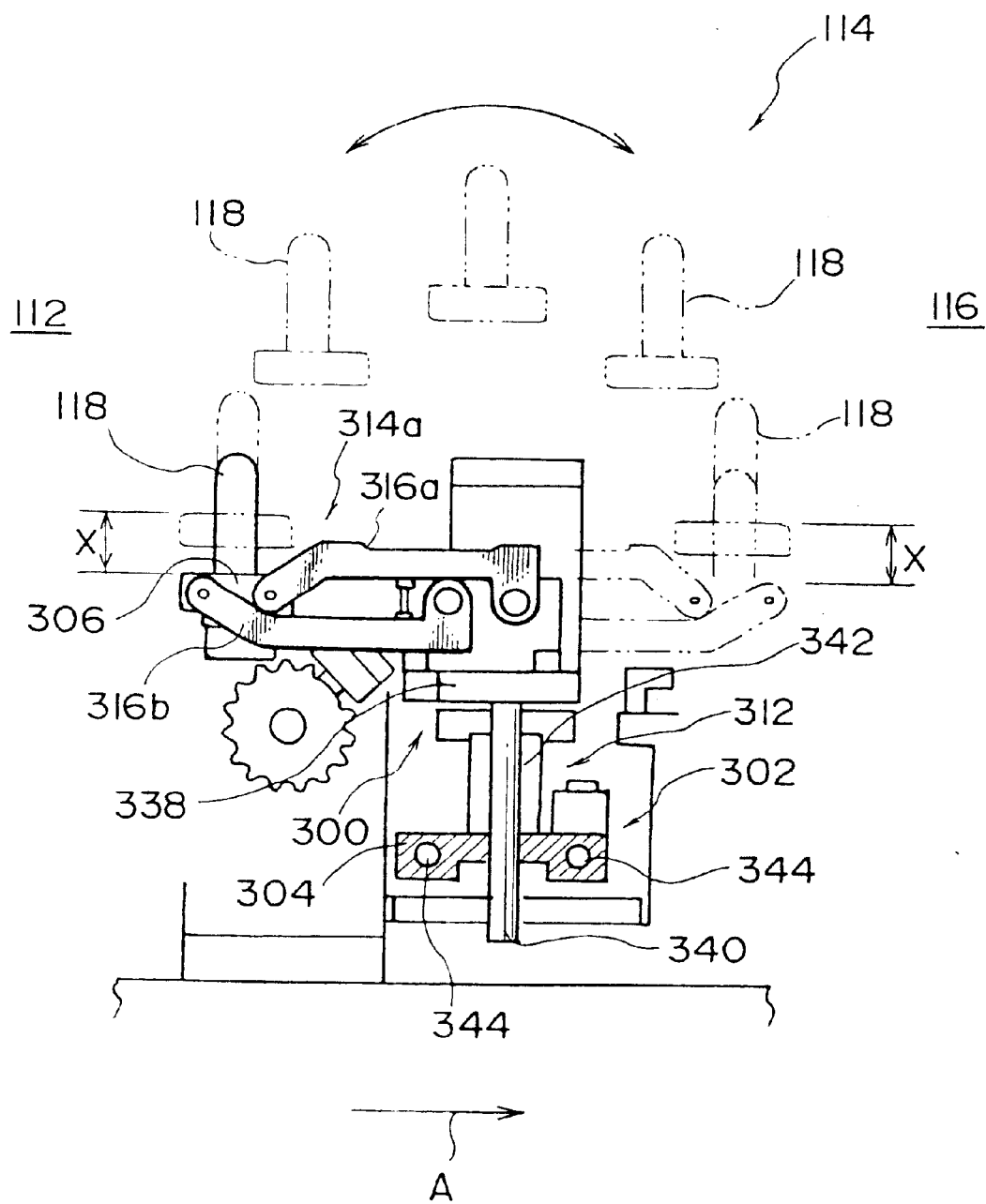
FIG. 10 is a side view illustrating the preforms transferred by the transferring mechanism.

The transfer section 114 transfers four preforms 118 heated by the heating station 112 at a time. As shown in FIGS. 5, 9 and 10, the transfer section 114 comprises a pair of transfer mechanisms 300 for delivering the inverted preforms 118 to the blow molding station 116 maintaining their inverted state, and a pair of pitch changing mechanisms 302 for changing the pitch of the preforms 118 in the heating station 112 to the pitch of the blow molding at the blow molding station 116.

Each of the transfer mechanisms 300 is mounted on a transfer mechanism base 304 while each of the pitch changing mechanisms 302 can move the respective one of the transfer mechanism bases 304.

Each of the transfer mechanisms 300 comprises second gripping members 306, a second opening/closing mechanism 308, a movement mechanism 310 and a second elevator mechanism 312.

In each of the transfer mechanisms 300, two pairs of such gripping members 306 are located, in which each pair is opposed to each other, so that they can receive and grip the neck portions 120 of two preforms 118 carried from the first carrying paths 200 at one time.

The second opening/closing mechanism 308 comprises two pairs of transfer arms 314a and 314b on each of which one second gripping member 306 is mounted. Each of the transfer arms 314a and 314b comprises a pair of upper and lower arm members 316a, 316b as shown in FIGS. 9 and 10.

Each of the arm members 316a and 316b i the respective transfer arms 314a and 314b is supported by one of a pair of parallel rotating shafts 318a and 318b which are slidable in the axial direction.

Each of the arm members 316a and 316b includes a mounting bore in which the respective rotating shaft 318a or 318b is mounted. The mounting bore includes an inward extending pin 320 as shown in FIG. 9. FIG. 9 illustrates the upper arm members 316a at its left side and the lower arm members 316b at its right side. Each rotating shaft 318a on which the arm members 316a of the transfer arms 314a and 314b are mounted includes an axially extending slide groove 324 formed at a position corresponding to the pin 320 of the arm member 316a on the side of the transfer arm 314a, and an aperture 322 formed at a position corresponding to the arm member 316a of the transfer arm 314b for engaging the corresponding pin 320.

Each rotating shaft 318b on which the arm members 316b of the transfer arms 314a and 314b are mounted includes an aperture 322 formed at a position corresponding to the pin 320 in the arm member 316b of the transfer arm 314a for engaging the pin 320, and an axially extending slide groove 324 formed at a position corresponding to the pin 320 in the arm member 316 of the transfer arm 314b. Each of the rotating shafts 318a and 318b also includes a circumferential rack portion 326 formed therein. A pinion 328 is disposed between the rack portions 326.

One of the rotating shafts 318b is connected to an opening/closing cylinder 330. When this opening/closing cylinder 330 is actuated, it causes the rotating shafts 318a and 318b to slide in the opposite directions. As a result, the pin 320 on each of the arm members 316a of the transfer arms 314a slidably moves in the corresponding slide groove 324 of the rotating shaft 318a while at the same time the pin 320 on each of the arm members 316b of the transfer arms 361b slidably moves in the corresponding slide groove 324 of the rotating shaft 318b. Thus, the transfer arms 314a and 314b can be moved away from or toward each other to open or close the second gripping members 306.

Each of the movement mechanisms 310 comprises a transfer actuator 332 connected to one of the rotating shafts 318a, teeth 334 formed on the outer periphery of each of the rotating shafts 318a and 318b, and a sprocket 336 operatively engaged by these teeth 334.

When the rotating shaft 318a is rotatably driven by the transfer actuator 332, the other rotating shaft 318b is also rotated through the teeth 334 and sprocket 336. Thus, the transfer arms 314a and 314b mounted on these rotating shafts 318a and 318b will be swiveled between the heating station 112 and the blow molding station 116.

At this time, the arm members 316a and 316b on the transfer arms 314a and 314b function as a parallel linkage to translate the second gripping member 306.

Therefore, the inverted preforms 118 carried from the first carrying paths 118 will be transferred to the blow molding station 116 by the transfer arms 314a and 314b while being maintained in their inverted state.

Each of the second elevator mechanisms 312 comprises an elevator platform 338 on which the second gripping members 306, the second opening/closing mechanism 308 and the movement mechanism 310 are supported. Guide rods 340 extend downward from the elevator platform 338 and through the transfer mechanism base 304, and an elevator cylinder 342 mounts on the transfer mechanism base 304 for elevating the elevator platform 338.

In such an arrangement, the movement of the second gripping members 306 by the elevator cylinder 342 is selected to be equal to a distance X through which the neck portions 120 of the preforms 118 can be fitted into the first carrying members 206 or the like.

Each of the pitch changing mechanisms 302 comprises guide rods 344 for supporting the transfer mechanism base 304 so that it can be slidably moved toward or away from the transfer mechanism base 304 in the other pitch changing mechanism 302, and a pitch changing cylinder 346 for slidably driving the transfer mechanisms base 304.

When the transfer mechanisms 300 are positioned spaced away from each other and after the transfer mechanisms 300 have received the preforms 118 from the first carrying paths 200 in the heating station 112, the transfer mechanisms 300 are then moved toward each other by the pitch changing cylinder 346 to change the pitch in the just received preforms 118 to the other, or blow molding, pitch required by the blow molding station 116 before they are delivered to the blow molding station 116. In this connection, the movement of each of the transfer mechanism bases 304 is limited by a shock absorber 348.

In such an arrangement, when the preforms 118 are to be transferred from the heating station 112 to the blow molding station 116, the second gripping members 306 have been opened and positioned relative to the outputs of the respective first carrying paths 200 in the heating station 112 from which the first carrying members exit. As the first carrying members 206 reach and stop at the outputs of the first carrying paths 200, the second gripping members 306 are closed to grip the neck portions 120 of the preforms 118 by the second opening/closing mechanism 308.

In such a condition, the second elevator mechanism 312 lifts the second gripping members 306 by the aforementioned distance X wherein the neck portions 120 of the preforms 118 can be removed out of the respective first carrying members 206.

Furthermore, the movement mechanism 310 translates the transfer arms 314a and 314b from the heating station 112 to the blow molding station 116 without changing the second gripping members 306 in their attitude. Thus, the preforms 118 can be transferred to the blow molding station 116 while being maintained in their inverted state.

In this case, the pitch changing cylinders 346 of the pitch changing mechanisms 302 move the transfer mechanisms 300 toward each other so that the pitch desired by the blow molding station 116 will be attained.

Furthermore, the second elevator mechanisms 312 lower the second gripping members 306 while the second opening/closing mechanisms 308 open the second gripping members 306. As a result, the preforms 118 can be delivered to the blow molding station 116.

Figure 11:
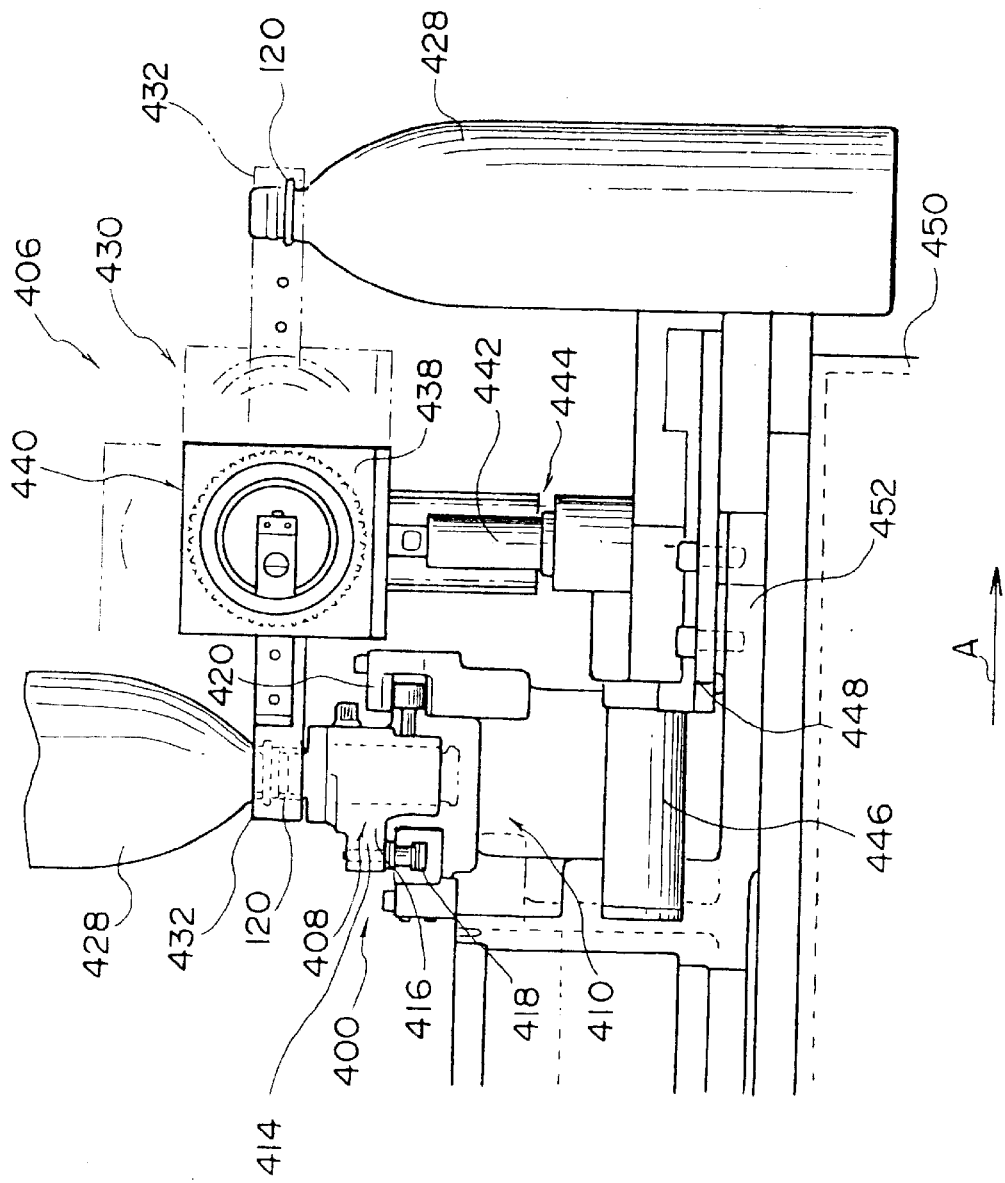
FIG. 11 is a side view of the removal section in the blow molding station of FIG. 1.

As shown in FIGS. 1 and 11, the blow molding station 116 comprises a second carrying path 400, a receiving section 402, a blow molding section 404 and a removing section 406.

The second carrying path 400 is of a substantially rectangular configuration having shorter sides and longer sides. One of the shorter sides is disposed opposed to the transfer section 114. The second carrying path 400 comprises second carrying members 408 and a second carrying mechanism 410.

Each of the carrying members 408 carries a preform 118 in its inverted state and is supported on a bracket 414. The carrying member 408 has a preform support section 412 extending upward from its bracket 414.

The second carrying mechanism 410 carries and circulates the carrying members 408 intermittently and comprises four sprockets 416 each disposed on one of the corners in the second carrying path 400 and a second carrying chain 418 passing around the four sprockets 416 to form a rectangular configuration. The second carrying chain 418 is further guided by second carrying rails 420 which are disposed along the second carrying path 400. A set of four second carrying members 408 spaced away from one another with the blow molding pitch are connected to the second carrying chain 418 through brackets 414.

Any one of the four sprockets 416 is operatively connected to an intermittently carrying motor (not shown) which intermittently moves each set of the four second carrying members 408.

The receiving section 402 is disposed on the shorter side of the second carrying path 400 adjacent to the transfer section 114 and receives four preforms 118 from the transfer section 114 at a time . Thus, four of the second carrying members 408 will be intermittently carried to and stopped at a position corresponding to the four second gripping members 306 in the transfer section 114.

The blow molding section 404 is located on one of the longer sides of the second carrying path 400 downstream in the preform carrying direction and stretches blow mold the preforms 118 received by the receiving section into containers. Thus, the blow molding section 404 comprises a stretch blow molding device 422 which can simultaneously stretch blow mold four preforms 118 received by the receiving section 402 into containers. The stretch blow molding device 422 is further clamped by a clamping mechanism 424 in a direction perpendicular to the second carrying path 400 in the blow molding section 404, the clamping mechanism 424 being located within a space between the longer sides of the second carrying path 400.

Between the receiving section 402 and the stretch blow molding device 422 of the blow molding section 404 is further provided a stand-by section 426 in which four preforms 118 to be blow molded by one shot will be retained. At the stand-by section 426, the temperature in the four preforms 118 is equalized after they have been heated by the heating station 112. The stand-by section 426 may have a temperature regulating section usable for flat containers.

In order to avoid the preform 118 being stopped at the corner of the second carrying path 400 in which the stand-by section 426 is located, the position in which the second carrying members 408 are stopped at the receiving section 402 may be slightly offset from the center of the removing section.

The removing section 406 is located on the other shorter side of the second carrying path 400 opposed to the receiving section 402 and removes containers 428 molded by the stretch blow molding device 422 in the blowing molding section 404. Thus, the removing section 406 comprises a removal device 430 located opposed to the second carrying path at the removal position. The removal device 430 removes four containers 428 carried to the removing section 406 at a time.

As shown in FIG. 11, the removal device 430 is of substantially the same structure as that of the inverting and delivering mechanism 126 in the supply section 110. Thus, the removal device 430 comprises four third gripping members 432 disposed for receiving the neck portions 120 of the containers 428, a third opening/closing mechanism 436 including an opening/closing cylinder 434 for opening/ closing the third gripping members 432, a second inverting mechanism 440 including an inverting actuator 438 for inverting the third gripping members 432, a third elevator mechanism 444 including an elevator cylinder 442 for elevating the third gripping members 432 together with the third opening/closing mechanism 436 and second inverting mechanism 440, and an advancing/retracting mechanism 448 including an advancing/retracting cylinder 446.

The removal device 430 can be retracted from the second carrying path 400 at the removing section 406 by the advancing/retracting cylinder 446. At this position, the third gripping members 432 are retained opened toward the second carrying path 400. If the containers 428 are stopped in place on the second carrying path 400, the advancing/retracting cylinder 446 advances the third gripping members 432 which are in turn closed by the opening/closing cylinder 434 to grip the neck portions 120 of the containers 428. Under such a condition, the elevator of cylinder 442 lifts the third gripping members 432 which are in turn retracted by the advancing/retracting cylinder 446. Thereafter, the elevator cylinder 442 further lowers the third gripping members 432. The third gripping members 432 are then inverted by the inverting actuator 438. If the opening/closing cylinder 434 opens the third gripping members 432, the neck portions 120 of the containers 428 are released. As a result, the containers 428 will fall down and be removed out of the system.

As shown in FIG. 1, the blow molding station 116 further comprises bases on a machine base 450. One of these bases located on the side of the removing section 106 forms a movable base 452 which can be moved relative to the other stationary bases along the longer sides of the second carrying path 400. Two of the sprockets 416 in the second carrying mechanism 410 are mounted on the movable base 452.

The movable base 452 further comprises a biasing mechanism 454 for biasing the movable base 452 in a direction in which the shorter sides of the second carrying path 400 are moved away from each other to give a tension to the second carrying chain 418.

The removal device 430 is placed on the movable base 452 to form an integrated unit. This eliminates the need for positioning the removal device 430 after the tension in the second carrying chain 418 has been regulated.

A heat blow molding method performed by the use of the aforementioned heat blow molding apparatus 100 will be described below.

In the first or preform supply step, the performs 118 are moved onto the supply rails 122 disposed in the preform carrying direction A, as shown in FIGS. 1 to 4. The supply rails 122 support the lower parts of the neck portions 120 in the preforms 118. The upright preforms 118 are then moved to the arrangement mechanism 124 under the action of gravity until they are stopped by the supply stopper 130.

The arrangement mechanism 124 then actuates the rodless cylinder 144 to move the supporting member 132*a* along the supply linear guide 138 in the leftward direction as viewed in FIG. 2. The supporting member 132*a* is then engaged by the other supporting member 132*b* to move them together in the leftward direction. After these supporting members 132*a*, 132*b* have passed the supply rails 122, they are stopped at the leftward position relative to the supply linear guide 138 wherein the supporting members 132*a*, 132*b* are placed at their stand-by state. During such a movement, the supply stopper 130 in the supply rails 122 is opened for inserting the preforms 118 into the notches 136 in the supporting members 132*a*, 132*b*. As the rodless cylinder 144 is moved in the rightward direction as viewed in FIG. 2, the supporting members 132*a*, 132*b* are moved together in the rightward direction through the stopper rod 146. The supporting member 132*a* can pass the stopper 148, but the other supporting member 132*b* is stopped by engagement with the stopper 148. Thus, the supporting members 132*a*, 132*b* will be stopped while being maintained spaced away from each other with the given distance through the stopper rod 146 as shown in FIG. 2. In such a manner, four preforms will be arranged in their upright state.

In the inverting and delivering mechanism 126, the first gripping members 150 are now in their opened and elevated stand-by state at the position adjacent to the arrangement mechanism 124. If four preforms 118 have been arranged by the supporting members 132*a*, 132*b* in the arrangement mechanism 124, the first elevator mechanism 154 lowers the first gripping members 150. When the first gripping members 150 are then closed by the first opening/closing mechanism 152, the neck portions 120 in the upright preforms 118 held by the supporting members 132*a*, 132*b* are gripped by the first gripping members 150. The first elevator mechanism 154 lifts the first gripping members 150 again, so that the preforms 118 are separated out of the supporting members 132*a*, 132*b*. The first inverting mechanism 156 then inverts the first gripping members 150 so that the preforms 118 are placed in their inverted state. The first elevator mechanism 154 again lowers the first gripping members 150 wherein they are opened by the first opening/closing mechanism 152. Thus, the inverted performs 118 can be delivered to the heating station 112.

In the heating step, as shown in FIGS. 5 to 8, the heating station 112 receives the preforms 118 from the inverting and delivering mechanism 126 through the respective pairs of first carrying members 206 in the two carrying paths 200 which are disposed parallel along the preform carrying direction A. The preforms 118 delivered to the first carrying members 206 are intermittently carried by the first carrying mechanisms 208 which carry the first carrying members 206. In addition, the first carrying members 206 are rotated about their center by the first and second rotation chains 250, 252 of the rotation mechanism 204 through the rotation sprockets 216. The first carrying members 206 are heated by the heating boxes 202 on the middle of the first carrying paths 200 while being rotated by the rotation mechanism 204. The heated preforms 118 will be heated to a temperature suitable for blow molding until they have been carried to the transfer section 114.

In such a case, the preforms 118 can be heated uniformly in their circumferential direction because they are rotated by the rotation mechanism 204.

In the first carrying paths 200, the preform neck portions 120 are first carrying members 206 will not be excessively heated and adversely affected by heat because the inverted preforms 118 are carried by the first carrying members 206.

In addition, each of the first carrying paths 200 is provided with a space corresponding to a single preform 118 between the upstream and downstream heating boxes 202, as described. When the heating step is temporarily rested within such a space, the difference of temperature between the outside and inside of the preform 118 heated by the upstream heating box 202 can be reduced. Thereafter, the preforms 118 will b moved into the downstream heating box 202.

As shown in FIG. 8, furthermore, the cooling air is supplied to the interior of the heating boxes 202 by the blowers 248 such that the service life in the reflectors 240 and heaters 238 can be prolonged by cooling the reflectors 240, terminal boxes 240 and heater supporting ends. Because the position of the heater rows 238 in the heating boxes 202 are regulated relative to the preform row 118 by moving them toward or away from the preform rows 118, the temperature profile along the length of the preforms 118 can be easily regulated.

In the transfer step, as shown in FIGS. 5, 9 and 10, the four second gripping members 306 are already in their stand-by state opened to the first carrying paths 200 at the height corresponding to the neck portions 120 of the preforms 118 being carried along the first carrying paths 200. When the preforms 118 intermittently carried by the first carrying members 206 are stopped at the transfer and removal position, the second opening/closing mechanisms 308 close the second gripping members 306 through the pairs of transfer arms 314a, 314b for gripping the neck portions 120 of the preforms 118.

In such a situation, the second elevator mechanisms 312 then lift the second carrying members 306 by the distance X so that the neck portions 120 of the preforms 118 are drawn out of the first carrying members 206 in the first carrying paths 200.

If the transfer actuators 332 of the movement mechanisms 310 are then initiated to rotate the rotating shaft 318a, the other rotating shaft 318b is also rotated through the teeth 334 and sprockets 336. Thus, the transfer arms 314a, 314b mounted on the rotating shafts 318a, 318b are swiveled between the heating station 112 and the blow molding station 116 in the same manner as in the parallel linkage. Therefore, the second gripping members 306 are moved while maintaining their vertical state. As a result, the preforms 118 can be transferred to the blow molding station 116 while being maintained inverted.

During the inverted step, the pitch changing cylinders 346 in the pitch changing mechanisms 302 move the transfer mechanism bases 304 toward each other. Thus, the pitch in the row of the preforms 118 can be changed to the blow molding pitch required by the blow molding station 116.

After the second carrying members 408 intermittently carried from the second carrying path 400 have been stopped in the blow molding station 116 at the receiving section 402, the second elevator mechanisms 312 lower the second gripping members 306 and at the same time the second opening/closing mechanisms 308 open the second gripping members 306. Thus, the preforms 118 can be delivered to the respective second carrying members 408 in the blow molding station 116. The second elevator mechanism 312 again lifts and retracts the second gripping members 306 from the second carrying path 400. Thus, the preforms 118 can be carried by the second carrying path 400.

In the blow molding step, as shown in FIGS. 1 and 11, the four inverted preforms 118 received from the transfer mechanisms 300 at the receiving section 402 are supported, at their neck portions 120, by the second carrying members 408. Four supported preforms 118 are intermittently carried at a time by the second carrying chain 418 in the second carrying mechanism 410. The four preforms 118 are first placed in the stand-by section 426 which is disposed between the receiving section 402 and the blow molding section 404, wherein the difference of temperature in the heated preforms 118 is reduced.

Thereafter, the four preforms 118 are intermittently carried to the blow molding section 404 wherein they are stopped at the position of the stretch blow molding device 422. After the device 422 has been clamped by the clamping mechanism 424, the four preforms 118 are stretch blow molded into containers 428.

Since the simultaneously heated preforms 118 are also simultaneously blow molded any irregularity in the quality of product on the blow molding step can be avoided.

The blow molded containers 428 are then intermittently carried to the position of the removal device 430 in the removing section 406.

The removal device 430 has been retracted from the second carrying path 400 by the advancing/retracting cylinder 446 in the advancing/retracting mechanism and the third gripping members 432 have been in their stand-by state opened to the second carrying path 400. When the containers 428 are stopped at the removal device 430, the advancing/retracting cylinder 446 advances the third gripping members 432 again. The opening/closing cylinder 434 then closes the third gripping members 432 for gripping the necks of the containers 428. The elevator cylinder 442 then lifts the third gripping members 432 so that the neck portions 120 of the containers 428 are removed out of the second carrying members 408. The advancing/retracting cylinder 446 then retracts the third gripping members 432 again while the elevator cylinder 442 is lowered. Thereafter, the inverting actuator 438, inverts the third gripping members 432. If the third gripping members 432 are opened by the opening/closing cylinder 434 at this time, the neck portions of the containers 428 may be released. As a result, the containers 428 will fall down and be removed out of the system. Since the removal device 430 is mounted on the movable base 452 for applying a tension to the second carrying chain 418, it is not required to position the removal device 430 relative to the second carrying members 408 after the tension of the second carrying chain 418 has been regulated in tension.

Figure 12:
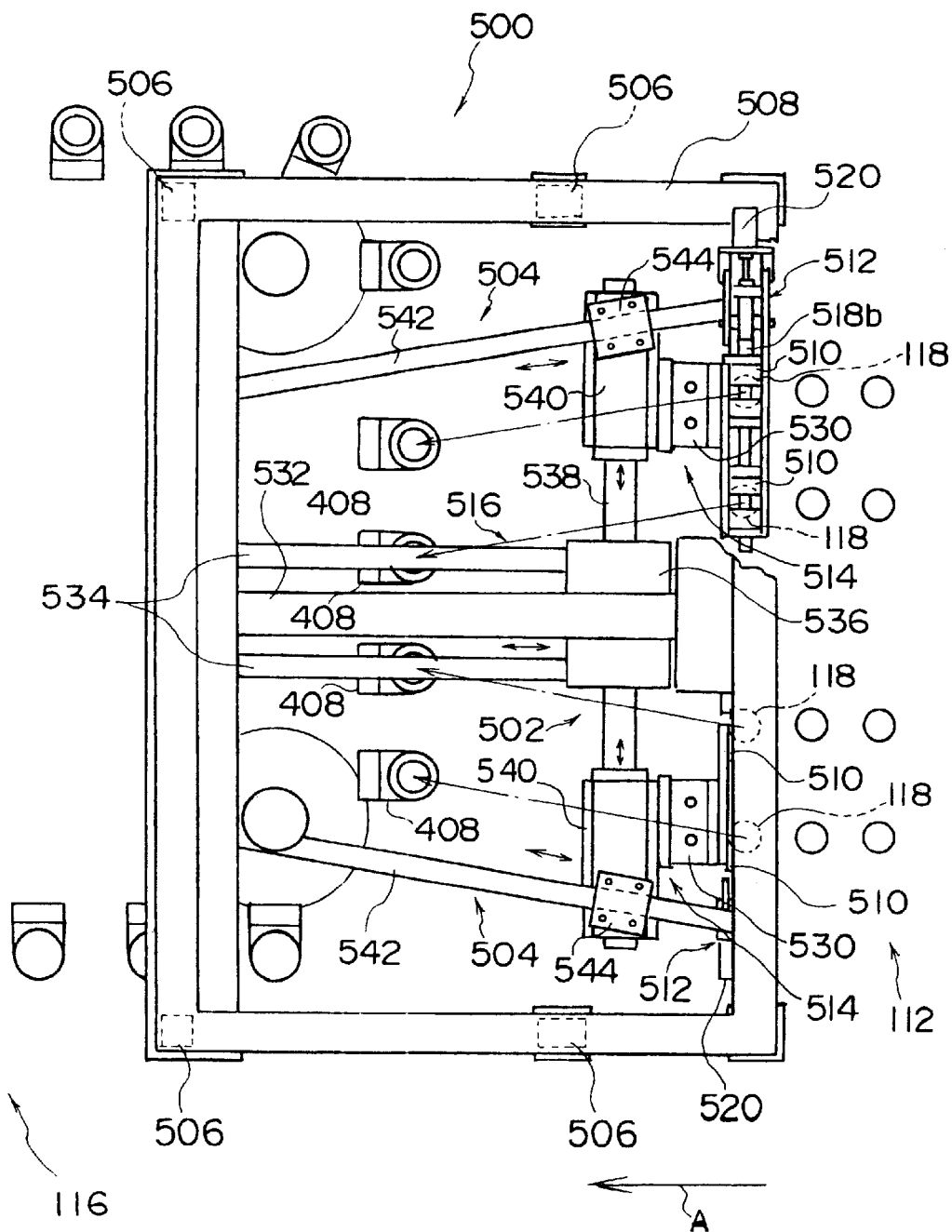
FIG. 12 is a plan view of a transfer section according to another aspect of the present invention, which extends from the heating station to the blow molding station.
Figure 13:
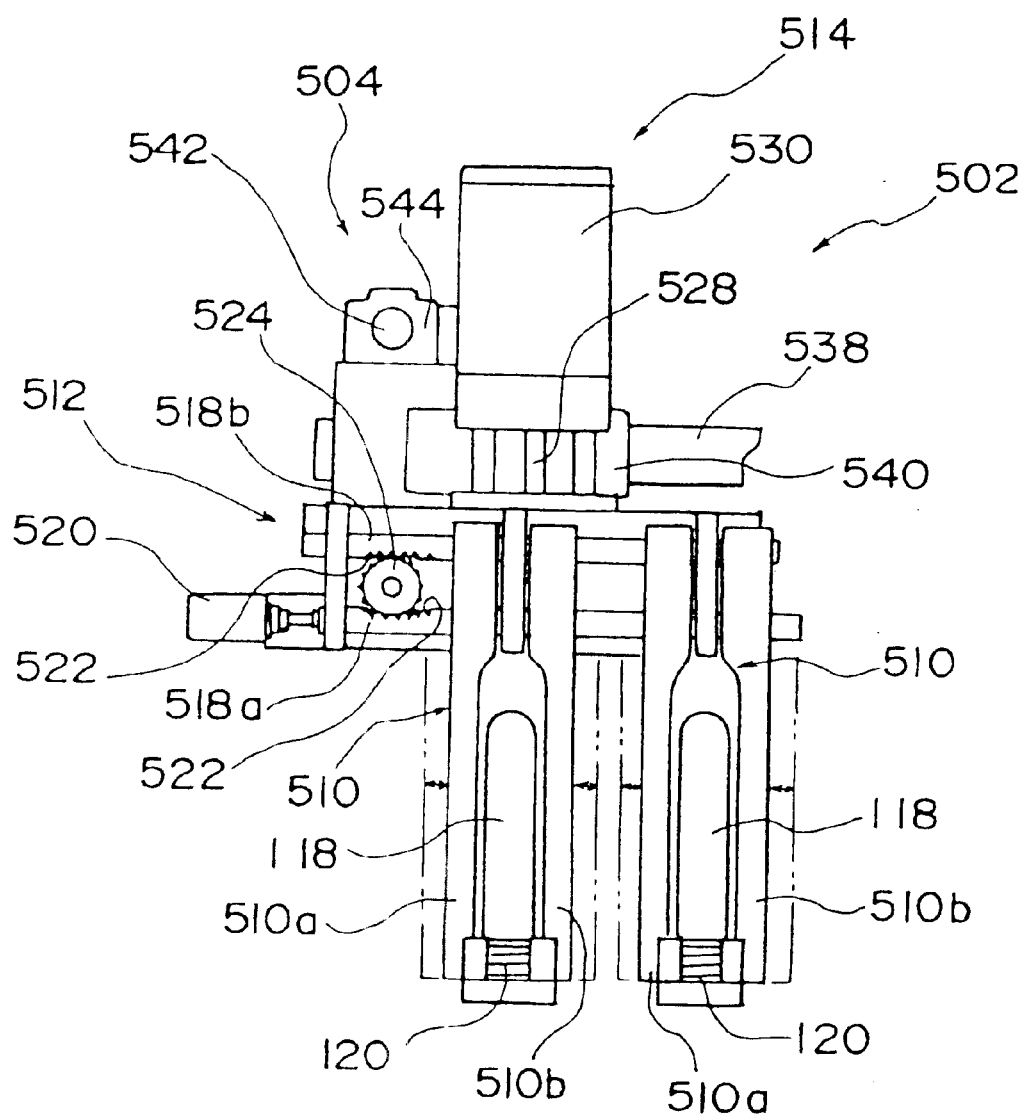
FIG. 13 is a fragmentary front view of the gripping members in FIG. 12.
Figure 14:
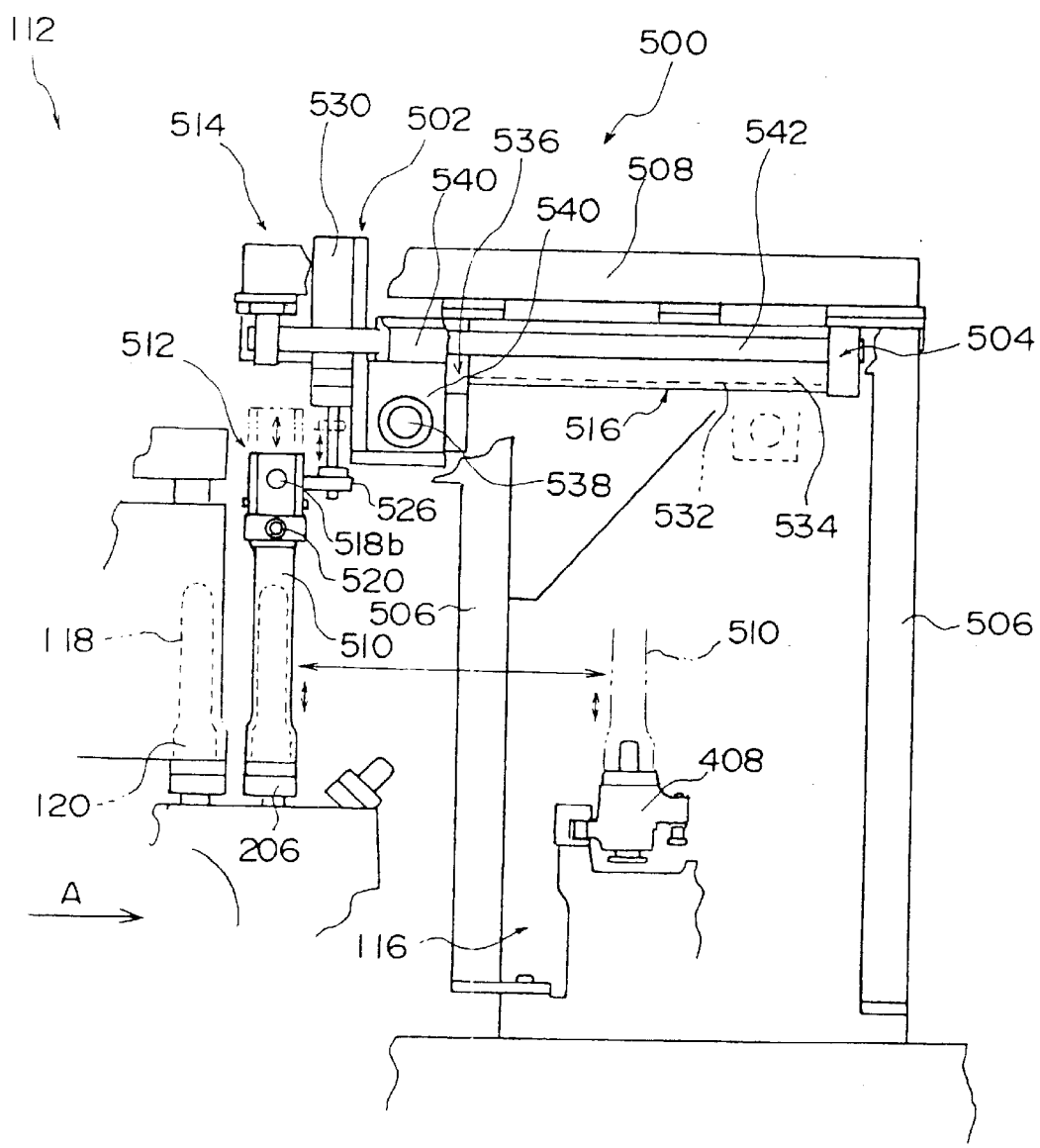
FIG. 14 is a side view of FIG. 12.
Figure 15:
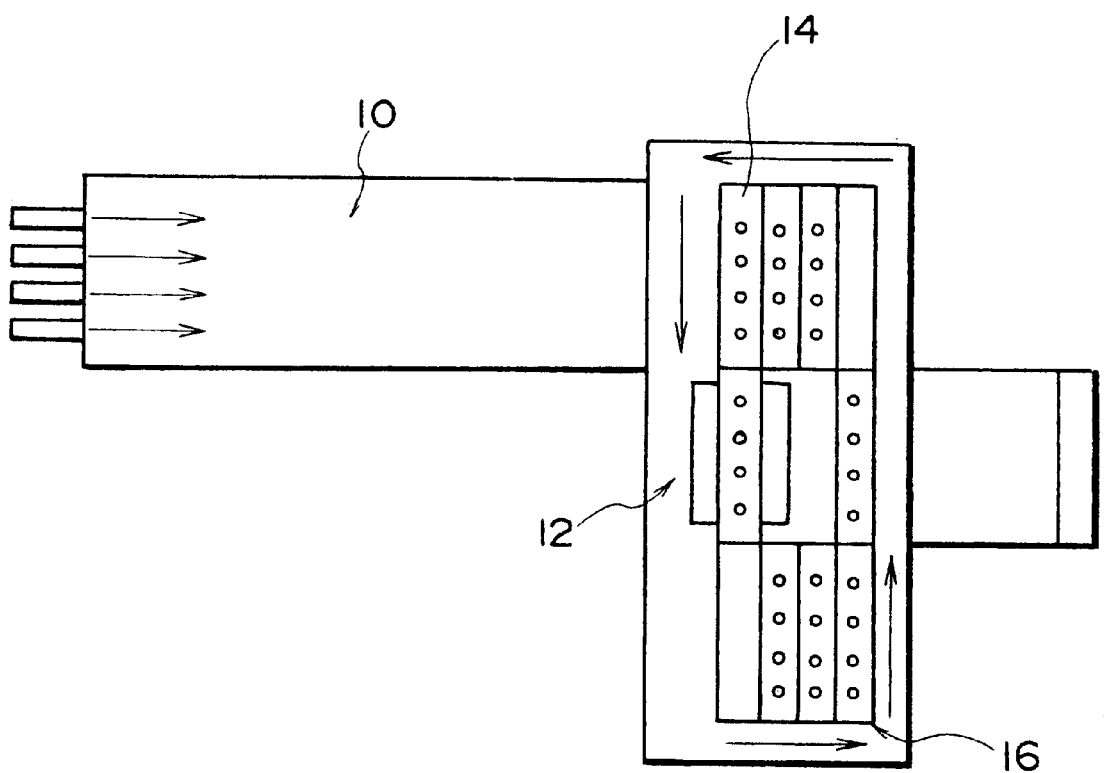
FIG. 15 is a plan view of a heat blow molding apparatus according to the prior art.

FIGS. 12 to 14 show another embodiment of a transfer section which can deliver the preforms from the heating station to the blow molding station according to the present invention.

An illustrated transfer section 500 comprises a transfer mechanism 502 for transferring four inverted preforms 118 to the blow molding station 116 after they have been heated at the heating station 112, and a pitch changing mechanism 504 for changing the pitch in the four preforms 118 on the two first carrying paths 200 in the heating station 112 to the blow molding pitch required by the blow molding station 116.

The transfer mechanism 502 and pitch changing mechanism 504 are mounted on a frame 508 which is supported above the transfer section through supports 506.

The transfer mechanism 502 comprises gripping members 510 for gripping the neck portions 120 of the preforms 118, gripping member opening/closing mechanisms 512 for opening/closing the gripping members 510 to grip/release them, elevator mechanisms 514 for elevating the gripping members 510, and a movement mechanism 516 for moving the gripping members 510 between the gripping position on the side of the heating station 112 an the receiving position on the side of the blow molding station 116.

Each of the gripping members 510 comprises a pair of gripping arms 510a, 510b which are disposed opposed to each other for gripping the neck portion 120 of one preform 118. Such gripping member pairs 510 are arranged correspondingly to every two preforms 118 carried along the two first carrying paths 200. Each pair of gripping members 510a, 510b vertically extend with the bottom ends being used to grip the neck portion 120 of the preform 118.

A pair of the gripping member opening/closing mechanisms 512 are provided to open or close each set of two gripping members 510 which correspond to every two preforms 118 carried along the respective first carrying paths 200.

Each of the gripping member opening/closing mechanisms 512 opens and closes the gripping arms 510a, 510b in each gripping member 510 for gripping or releasing the preform 118. For such a purpose, the gripping member opening/closing mechanism 512 comprises a pair of slide rods 518a, 518b disposed parallel in the vertical direction and a gripping member opening/closing cylinder 520.

One of the slide rods 518a fixedly supports one of the gripping arms 510a and slidably extends through the other gripping arm 510b. The other slide rod 518b slidably extends through the one gripping arm 510a and fixedly supports the other gripping arm 510b. Each of the slide rods 518a, 518b is formed with a rack 522 adjacent to one end, which rack 522 is disposed opposed to another rack 522 formed in the other slide rod adjacent to one end. A pinion 524 is disposed in the space between the rack portions 522 and engages with them.

Each of the gripping member opening/closing cylinders 520 is connected to one of the slide rods 518a. When the one slide rod 518a is slidably moved by the gripping member opening/closing cylinder 520, the other slide rod 518b is also slidably moved in the opposite direction through the pinion 524. Thus, the gripping arms 510a, 510b in each of the gripping members 510 can be opened or closed.

Each of the elevator mechanisms 514 lifts the gripping members 510 for removing or delivering the preforms 118. The elevator mechanism 514 comprises a support bracket 526 for elevatably supporting the corresponding gripping member opening/closing mechanism 512 and an elevator cylinder 530 including an elevator rod 528 that is connected to the support bracket 526. Thus, the gripping members 510 can be elevated by the gripping member opening/closing mechanism 512.

The movement mechanism 516 moves the gripping members 510 from the preform removing position in the heating station 112 to the delivering position in the blow molding station 116, and comprises a rodless cylinder 532, movement guide rods 534, movement members 536, contacting/separating movement guide rods 538 and contacting/separating movement members 540.

The rodless cylinder 532 is located substantially at the center of the frame 508 to extend in the preform carrying direction A.

A pair of the movement guides 534 are disposed parallel to each other on the opposite sides of the rodless cylinder 532.

Each of the movement members 536 is connected to the rodless cylinder 532 and slidably engaged by the corresponding movement guide rod 534 so that the movement members 536 are movable in the preform carrying direction A.

Each of the contacting/separating movement guide rods 538 is disposed to extend in a direction perpendicular to the preform carrying direction A and mounted substantially at its middle on the movement member 536. Thus, the contacting/separating movement guide rods 538 are movable to the preform carrying direction A.

A pair of the contacting/separating movement members 540 are slidably supported relative to the contacting/separating movement guide rod 538 on the opposite sides thereof about the movement guide rods 534.

Each of the elevator cylinders 530 is connected to one of the contacting/separating movement members 540.

When the rodless cylinder 532 moves the movement members 536 along the movement guide rods 534 in the preform carrying direction A, the elevator mechanisms 514 are also moved through the contacting/separating movement guide rods 538 and contacting/separating movement members 540. Thus, two gripping members 510 connected to these elevator mechanisms 514 through the gripping member opening/closing mechanisms 512 will be moved in the preform carrying direction A on the opposite sides of the corresponding movement guide rods 534.

Each of the pitch changing mechanisms 504 comprises a pair of pitch changing guide rods 542 located outside the corresponding movement guide rod 534. The pitch changing guide rods 542 are disposed to decrease the distance therebetween from the heating station 112 toward the blow molding station 116. Each of the pitch changing guide rods 542 is connected to the corresponding contacting/separating movement member 540 through a bracket 544, so that the contacting/separating movement members 540 can be moved along the pitch changing guide rods 542.

When the contacting/separating movement guide rods 538 are moved with movement of the movement members 536 in the preform carrying direction A, the contacting/separating movement members 540 are moved while being guided by the pitch changing guide rods 542. Thus, the contacting/separating movement members 540 are gradually moved toward each other on the contacting/separating movement guide rods 538. When the gripping members 510 reach the receiving position of the blow molding station 116, the pitch between the inner gripping members 510 attached to the pair of gripping member opening/closing mechanisms 512 will be changed to the blow molding pitch.

When the preforms 118 are to be transferred to the blow molding station 116 at the transfer section 500, the gripping members 510 are positioned in the preform removing side of the heating station 112. The elevated mechanisms 514 then lower the gripping members 510 to their gripping position while the gripping member opening/closing mechanisms 512 open the gripping members 510. The gripping members 510 are placed in their stand-by positions under such a situation.

When the inverted preforms 118 heated by the heating station 112 are stopped at their receiving positions, the gripping member opening/closing mechanisms 512 close the gripping members 510. After the neck portions 120 of the preforms 118 have been gripped by the closed gripping members 510, the elevator mechanisms 514 elevate the gripping members 510 so that the neck portions 120 of the preforms 118 are drawn out of the first carrying members 206.

The rodless cylinder 532 then moves the movement members 536 along the movement guide rods 534 in the preform carrying direction A. Thus, the respective elevator mechanisms 514 are also moved through the contacting/separating movement guide rods 538 and the pair of contacting/separating movement members 540. Two gripping members 510 connected to each of the elevator mechanisms 514 through the corresponding gripping member opening/closing mechanism 512 are moved in the preform carrying direction A on the opposite sides of the corresponding movement guide rod 534.

When the contacting/separating movement guide rods 538 are moved with movement of the movement members 536 in the preform carrying direction A, each of the contacting/separating movement members 540 is moved while being guided by the corresponding pitch changing guide rod 542. Thus, the contacting/separating movement members 540 are gradually moved toward each other on the respective contacting/separating movement guide rods 538. As the gripping members 510 reach the receiving position in the blow molding section 116, the pitch between the inner gripping members 510 attached to the gripping member opening/closing mechanism pair 512 will be changed to the blow molding pitch.

In such a situation, when the second carrying members 408 are intermittently carried to the receiving section 402 of the blow molding station 116 along the second carrying path 400 and then stopped thereat, the elevator mechanisms 514 then lower the griping members 510 which are in turn opened by the gripping member opening/closing mechanisms 512. Thus, the preforms 118 can be delivered to the respective second carrying members 408 in the blow molding station 116.

The elevator mechanisms 514 again lift and retract the griping members 510 from the second carrying path. Thus, the preforms 118 can be carried by the second carrying members 408.

The rodless cylinder 532 then moves the movement members 536 toward the heating station 112. The elevator mechanisms 514 again lower the gripping members 510 which will be placed at the next removal stand-by state.

The present invention is not limited to the aforementioned embodiments, but may be carried out in various other forms that fall within the scope of the present invention.

For example, the number of preforms to be carried may be suitably selected for a purpose.

When the preforms are to be transferred from the heating station to the blow molding station, the preform carrying pitch required by the heating station may be pre-changed to the desired blow molding pitch in the heating station without need of the pitch change in the transfer section.

What is claimed is:

1. A heat blow molding apparatus comprising:
   a supply section for supplying preforms each having a neck portion;
   a heating station for heating said preforms supplied from said supply section;
   a transfer section for transferring said performs after they have been heated in said heating station; and
   a blow molding station for blow molding said preforms transferred from said transfer section into containers;
   said supply section, said heating station, said transfer section and said blow molding station being arranged linearly along a first direction to which said preforms are carried,
   wherein said supply section comprising:
     an arrangement mechanism for arranging said preforms with a given pitch in a second direction perpendicular to said first direction while maintaining said preforms in their upright state with said neck portions thereof facing upward; and
     an inverting and delivering mechanism for inverting said upright performs and for delivering the inverted preforms to said heating station,
   wherein said heating station comprising:
     first carrying paths disposed parallel along said first direction;
     first carrying members for supporting said inverted preforms delivered from said supply section;
     a first carrying mechanism for intermittently carrying said first carrying members along said first carrying paths;
     a heating box located in each of said first carrying paths; and
     a rotation mechanism for rotating said preforms at least within said heating box;
   wherein said transfer section having a movement mechanism for moving said preforms carried parallel along said first carrying paths from said heating station to said blow molding station for delivery while maintaining their inverted position, and
   wherein said blow molding station comprising:
     a second carrying path formed into a substantially rectangular configuration having two shorter sides and two longer sides, said two longer sides being positioned parallel to said first direction;
     second carrying members for supporting said preforms in their inverted state, said second carrying members being carried along said second carrying path;
     a second carrying mechanism for intermittently carrying said second carrying members along said second carrying path;
     a receiving section located in one of said two shorter sides that is disposed on the side of said transfer section in said second carrying path;
     a blow molding section located one of said two longer sides in said second carrying path for stretch blow molding said preforms received by said receiving section simultaneously into containers; and
     a removal section located in the other shorter sides opposed to said receiving section for removing said containers after being molded in said blow molding section.

2. The heat blow molding apparatus according to claim 1, wherein said arrangement mechanism comprises:
   supporting members for supporting said preforms in their upright state; and
   a pitch converting mechanism for converting the pitch of said preforms by moving said supporting members in said second direction.

3. The heat blow molding apparatus according to claim 2, wherein said supply section includes a supply path for supplying preforms in one line, and
   wherein said supporting members are moved in the second direction by said pitch converting mechanism so that said preforms supplied from the supply section in one line can be sequentially supported by said supporting members.

4. The heat blow molding apparatus according to any one of claim 1, wherein said inverting and delivering mechanism comprises:
   first gripping members for gripping the neck portions of said preforms after they have been arranged with the given pitch by said arrangement mechanism;
   a first opening/closing mechanism for opening or closing said first gripping members to grip or release said preforms;
   a first elevator mechanism for moving the first gripping members upward and downward; and
   an inverting mechanism for inverting the first gripping members.

5. The heat blow molding apparatus according to any one of claim 1, wherein said movement mechanism in said transfer section comprises:
   second gripping members for gripping the neck portions of said preforms;
   a second opening/closing mechanism for opening or closing said second gripping members to grip or release said preforms; and a second elevator mechanism for moving said second gripping members upward and downward.

6. The heat blow molding apparatus according to any one of claim 1, wherein said blow molding station comprises:
   a machine base;
   a stationary base fixedly mounted on said machine base; and
   a movable base enabled to move on said machine base along a parallel direction to the longer sides of the second carrying path,
   wherein said second carrying mechanism in the second carrying path comprise:
      sprockets mounted on said stationary and movable bases;
      a chain spanned between said sprockets; and
      a biasing mechanism for biasing said movable base in a direction in which the shorter sides of the second carrying path are separated from each other to apply a tension to the chain through said sprockets, and
   wherein said removal section has a removing device on the movable base for taking containers molded at said blow molding section out of said second carrying members.

7. A heat blow molding apparatus for blow molding preforms into containers comprising:
   a heating station for simultaneously heating preforms carried parallel to a first direction; said heating station comprising means for forming two separate first carrying paths each extending in the first direction and disposed parallel to each other for carrying said preforms each having a neck portion in their inverted state with said neck portions thereof facing downward, wherein there are separate means for carrying said preforms along each first carrying path in said first direction;
   a transfer section for transferring said preforms carried parallel to each other while maintaining their inverted state; and
   a blow molding station for simultaneously blow molding said preforms, which are simultaneously heated at said heating station and transferred by said transfer section into containers.

8. A heat blow molding apparatus comprising:
   a heating station for heating performs while carrying them in a first direction;
   a transfer section for transferring said preforms heated by said heating station; and
   a blow molding station for blow molding said preforms transferred from said transfer section into containers,
   said heating station, said transfer section and said blow molding station being arranged linearly in said first direction,
   wherein said heating station having first carrying paths disposed parallel to one another, said heating station simultaneously heating said preforms carried along said first carrying paths,
   wherein said blow molding station comprises:
      a second carrying path formed into a substantially rectangular configuration having two shorter sides and two longer sides, said two longer sides being disposed parallel to said first direction,
      second carrying members for being carried along said second carrying path while supporting said preforms;
      a receiving section located on one of said shorter sides of said second carrying path which is disposed on the side of said transfer section; and
      a blow molding section located in one of said two longer sides of said second carrying path for simultaneously stretch blow molding said preforms received by said receiving section into containers; and
   wherein said transfer section transfers said preforms from the terminal ends of said first carrying paths in said heating station to the receiving section of said blow molding station.

9. A method of heat blow molding for blow molding preforms into containers comprising the steps of:
   simultaneously heating preforms carried parallel to a first direction within a heating station while said preforms each having a neck portion are supported in their inverted state with said neck portions thereof facing downward;
   transferring said preforms which are simultaneously heated and carried parallel one another from the heating station to a blow molding station while maintaining said preforms inverted; and
   simultaneously blow molding said preforms received by said blow molding station into containers while maintaining said preforms inverted, wherein during said step of heating, said preforms are carried in carriers along two separate but parallel first paths by separate carrier members.

10. The method of heat blow molding according to claim 9, further comprising a step of supplying said preforms to said heating station, wherein said supplying step comprises the steps of:
   arranging said preforms with a given pitch in a second direction perpendicular to said first direction while maintaining said preforms in their upright state with said neck portions thereof facing upward; and
   inverting said upright performs and delivering said inverted preforms to said heating station.

11. The method of heat blow molding according to claim 10,
   wherein said supplying step includes a step of supplying said preforms in one line, and
   wherein said arranging step includes; a step of causing supporting members to sequentially support said preforms supplied in one line by moving said supporting members in said second direction; and a step of converting a pitch of said preforms by moving said supporting members in said second direction.

12. A heat blow molding apparatus according to claim 7, wherein the heating station comprises a separate set of heating elements for each carrying path.

13. The method according to claim 9, wherein in the step of heating, the preforms in each separate carrying path are heated using separate heating elements.

* * * * *